US011825482B2

(12) United States Patent
Yang et al.

(10) Patent No.: US 11,825,482 B2
(45) Date of Patent: Nov. 21, 2023

(54) TECHNIQUES FOR IMPROVED CONTROL CHANNELS

(71) Applicant: QUALCOMM Incorporated, San Diego, CA (US)

(72) Inventors: Yang Yang, San Diego, CA (US); Peter Pui Lok Ang, San Diego, CA (US); Wanshi Chen, San Diego, CA (US); Heechoon Lee, San Diego, CA (US); Jing Jiang, San Diego, CA (US); Tingfang Ji, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/663,154

(22) Filed: Jul. 28, 2017

(65) Prior Publication Data

US 2018/0098307 A1 Apr. 5, 2018

Related U.S. Application Data

(60) Provisional application No. 62/403,682, filed on Oct. 3, 2016.

(51) Int. Cl.
*H04W 72/23* (2023.01)
*H04W 76/27* (2018.01)
(Continued)

(52) U.S. Cl.
CPC ............. *H04W 72/23* (2023.01); *H04L 5/001* (2013.01); *H04L 5/0053* (2013.01);
(Continued)

(58) Field of Classification Search
CPC ..... H04L 5/001; H04L 5/0053; H04L 5/0094; H04W 72/042
See application file for complete search history.

(56) References Cited

U.S. PATENT DOCUMENTS 8,644,245 B2 * 2/2014 Ahn ..................... H04W 72/044
455/450
8,958,379 B2 2/2015 He et al.
(Continued)

FOREIGN PATENT DOCUMENTS

CN 101478379 A 7/2009
CN 101594204 A 12/2009
(Continued)

OTHER PUBLICATIONS

International Search Report and Written Opinion—PCT/US2017/044626—ISA/EPO—dated Mar. 8, 2018 (170059WO).
(Continued)

*Primary Examiner* — Khaled M Kassim
*Assistant Examiner* — Berhanu D Belete
(74) *Attorney, Agent, or Firm* — Holland & Hart LLP/QUALCOMM INCORPORATED

(57) ABSTRACT

Methods, systems, and devices for wireless communication are described. A method may include receiving a control transmission from a base station, identifying a control channel search space organized according to a nested structure, the control channel search space including a plurality of control channel candidates associated with one or more control channel elements (CCEs) and an aggregation level, and searching the received control transmission to identify a control channel for the UE using the plurality of control channel candidates. Another method may include determining whether to reorder resource element group (REG) indices for a received control channel transmission based, at least in part, on a transmission mode associated with the control channel transmission. Another method may include decoding a received control channel transmission, where the downlink control information (DCI) formats may be con-
(Continued)

US 11,825,482 B2

Page 2 strained to an integer multiple of a predetermined base number of bits N.

30 Claims, 21 Drawing Sheets

(51) Int. Cl.
    *H04W 88/08*     (2009.01)
    *H04L 5/00*     (2006.01)
    *H04L 25/02*     (2006.01)
    *H04W 72/0446*     (2023.01)
    *H04W 88/02*     (2009.01)

(52) U.S. Cl.
    CPC .......... *H04L 5/0094* (2013.01); *H04L 25/024* (2013.01); *H04W 72/0446* (2013.01); *H04W 76/27* (2018.02); *H04W 88/02* (2013.01); *H04W 88/08* (2013.01)

(56) References Cited

U.S. PATENT DOCUMENTS

| | | | |
|---|---|---|---|
| 8,989,121 B2* | 3/2015 | Luo | H04W 72/541 |
| | | | 370/329 |
| 8,989,208 B2 | 3/2015 | Chen et al. | |
| 9,054,843 B2* | 6/2015 | Frederiksen | H04W 72/23 |
| 9,119,195 B2 | 8/2015 | McBeath et al. | |
| 9,191,159 B2 | 11/2015 | Seo et al. | |
| 9,204,439 B2* | 12/2015 | Frederiksen | H04W 72/23 |
| 9,281,933 B2* | 3/2016 | Ahn | H04L 5/0053 |
| 9,560,655 B2* | 1/2017 | Von Elbwart | H04W 72/0453 |
| 9,609,642 B2* | 3/2017 | Xia | H04L 5/0094 |
| 9,668,254 B2* | 5/2017 | Liu | H04L 5/0051 |
| 9,674,827 B2* | 6/2017 | Liu | H04W 72/23 |
| 9,716,578 B2 | 7/2017 | Takeda et al. | |
| 9,717,080 B2* | 7/2017 | Golitschek Edler von Elbwart ... | |
| | | | H04L 5/0007 |
| 10,505,680 B2 | 12/2019 | Marinier et al. | |
| 2008/0261658 A1 | 10/2008 | Jin et al. | |
| 2010/0316146 A1* | 12/2010 | McBeath | H04L 5/0091 |
| | | | 375/260 |
| 2010/0317360 A1* | 12/2010 | McBeath | H04L 5/0091 |
| | | | 455/450 |
| 2011/0076962 A1 | 3/2011 | Chen et al. | |
| 2012/0039283 A1* | 2/2012 | Chen | H04L 5/0053 |
| | | | 455/450 |
| 2013/0114521 A1* | 5/2013 | Frenne | H04L 5/0053 |
| | | | 370/329 |
| 2013/0142142 A1* | 6/2013 | McBeath | H04W 72/042 |
| | | | 370/329 |
| 2014/0036810 A1* | 2/2014 | Harrison | H04L 5/0094 |
| | | | 370/329 |
| 2014/0071935 A1* | 3/2014 | Papasakellariou | H04L 5/0053 |
| | | | 370/330 |
| 2014/0185530 A1 | 7/2014 | Kuchibhotla et al. | |
| 2014/0185541 A1* | 7/2014 | Gaal | H04L 1/0046 |
| | | | 370/329 |
| 2014/0219227 A1* | 8/2014 | Suzuki | H04L 5/001 |
| | | | 370/329 |
| 2014/0301298 A1* | 10/2014 | Luo | H04L 5/0073 |
| | | | 370/329 |
| 2014/0328302 A1* | 11/2014 | Park | H04W 72/23 |
| | | | 370/329 |
| 2014/0348077 A1* | 11/2014 | Chen | H04W 76/27 |
| | | | 370/329 |
| 2014/0355451 A1* | 12/2014 | Kim | H04L 5/0055 |
| | | | 370/241 |
| 2014/0376490 A1* | 12/2014 | McBeath | H04L 5/003 |
| | | | 370/329 |
| 2015/0003349 A1* | 1/2015 | Kim | H04L 5/0048 |
| | | | 370/329 |
| 2015/0016370 A1* | 1/2015 | Takeda | H04W 72/1289 |
| | | | 370/329 |
| 2015/0036616 A1* | 2/2015 | Lee | H04W 72/23 |
| | | | 370/329 |
| 2015/0043521 A1* | 2/2015 | Park | H04L 1/1812 |
| | | | 370/330 |
| 2015/0098421 A1* | 4/2015 | Barbieri | H04W 72/23 |
| | | | 370/329 |
| 2015/0163780 A1* | 6/2015 | Ji | H04L 5/0048 |
| | | | 370/329 |
| 2015/0181440 A1* | 6/2015 | Chen | H04B 7/0697 |
| | | | 370/329 |
| 2015/0181569 A1* | 6/2015 | Kim | H04W 72/23 |
| | | | 370/329 |
| 2015/0189629 A1* | 7/2015 | Seo | H04W 72/23 |
| | | | 370/329 |
| 2015/0200741 A1* | 7/2015 | Liu | H04L 5/0053 |
| | | | 370/312 |
| 2015/0215908 A1* | 7/2015 | Seo | H04L 5/0048 |
| | | | 370/329 |
| 2015/0215917 A1* | 7/2015 | Suzuki | H04W 72/23 |
| | | | 370/329 |
| 2015/0237604 A1* | 8/2015 | Shi | H04W 72/0446 |
| | | | 370/330 |
| 2015/0237605 A1* | 8/2015 | Ji | H04L 5/0037 |
| | | | 370/329 |
| 2015/0237607 A1* | 8/2015 | Frederiksen | H04L 5/0053 |
| | | | 370/329 |
| 2015/0245322 A1* | 8/2015 | Shimezawa | H04W 72/23 |
| | | | 370/329 |
| 2015/0249974 A1* | 9/2015 | Lee | H04W 72/0446 |
| | | | 370/329 |
| 2015/0271788 A1* | 9/2015 | Kim | H04W 76/10 |
| | | | 370/329 |
| 2015/0312075 A1* | 10/2015 | Molnar | H04W 72/20 |
| | | | 375/260 |
| 2016/0021644 A1* | 1/2016 | Seo | H04W 72/23 |
| | | | 370/315 |
| 2016/0037491 A1* | 2/2016 | Hwang | H04L 5/0053 |
| | | | 370/330 |
| 2016/0037496 A1* | 2/2016 | McBeath | H04W 72/23 |
| | | | 370/329 |
| 2016/0037498 A1* | 2/2016 | Chen | H04W 72/0446 |
| | | | 370/329 |
| 2016/0057774 A1* | 2/2016 | Ahn | H04W 72/044 |
| | | | 370/329 |
| 2016/0112169 A1* | 4/2016 | Yerramalli | H04L 1/1822 |
| | | | 370/252 |
| 2016/0135070 A1* | 5/2016 | Lee | H03M 13/09 |
| | | | 370/252 |
| 2016/0295560 A1* | 10/2016 | Chen | H04L 5/0094 |
| 2016/0323857 A1* | 11/2016 | Kim | H04L 5/0053 |
| 2016/0338013 A1* | 11/2016 | Yu | H04L 1/08 |
| 2017/0026998 A1* | 1/2017 | Ahn | H04W 72/044 |
| 2017/0156133 A1* | 6/2017 | Xia | H04W 72/23 |
| 2017/0164395 A1* | 6/2017 | Papasakellariou | H04L 5/0044 |
| 2017/0237586 A1* | 8/2017 | Liu | H04W 72/23 |
| | | | 370/329 |
| 2017/0339684 A1* | 11/2017 | McBeath | H04L 5/003 |
| 2017/0347341 A1* | 11/2017 | Zhang | H04B 7/024 |
| 2017/0347342 A1* | 11/2017 | McBeath | H04W 72/23 |
| 2018/0049232 A1* | 2/2018 | Ahn | H04L 5/001 |
| 2018/0070340 A1* | 3/2018 | Kim | H04W 72/23 |
| 2018/0331811 A1* | 11/2018 | McBeath | H04L 5/0091 |
| 2018/0343094 A1* | 11/2018 | Wu | H04L 5/0048 |

FOREIGN PATENT DOCUMENTS

| | | | |
|---|---|---|---|
| CN | 102271402 A | 12/2011 | |
| CN | 102420685 A | 4/2012 | |
| CN | 102422584 A | 4/2012 | |
| CN | 102783064 A | 11/2012 | |
| CN | 104509194 A | 4/2015 | |

(56) References Cited

FOREIGN PATENT DOCUMENTS

| | | |
|---|---|---|
| CN | 104871589 A | 8/2015 |
| WO | WO-2010127300 | 11/2010 |

OTHER PUBLICATIONS

Mediatek Inc: "Analysis on (E)PDCCH Search Space Design in Coverage Enhancement Mode", 3GPP Draft; R1-140240, 3rd Generation Partnership Project (3GPP), Mobile Competence Centre; 650, Route Des Lucioles; F-06921 Sophia-Anti Polls Cedex; France, vol. RAN WG1, No. Prague, Czech Republic; Feb. 9, 2014, pp. 1-5, XP050735793, Retrieved from the Internet: URL:http://www.3gpp.org/ftp/Meetings_3GPP_SYNC/RAN/RAN1/Docs/ [retrieved on Feb. 9, 2014].

Moosavi R., et al., "A Fast Scheme for Blind Identification of Channel Codes", Proceedings of the IEEE Global Communications Conference (GLOBECOM), IEEE, May 10, 2011, XP002661515, Retrieved from the Internet: URL:http://urn.kb.sejresolve?urn=urn:nbn:se:liu:diva-68072 [retrieved on Oct. 12, 2011], 4 pages.

Partial International Search Report—PCT/US2017/044626—ISA/EPO—dated Nov. 24, 2017 (170059WO).

"LTE; Evolved Universal Terrestrial Radio Access (E-UTRA), Physical layer procedures (3GPP TS 36.213 version 10.2.0 Release 10)", Technical Specification, European Telecommunications Standards Institute (ETSI), 650, Route Des Lucioles, F-06921 Sophia-Antipolis, France, vol. 3GPP RAN 1, No. V10.2.0, Jun. 1, 2011 (Jun. 1, 2011), XP014066384, pp. 122.

European Search Report—EP21150789—Search Authority—Berlin—dated Apr. 22, 2021 (170059EPD1).

\* cited by examiner

TECHNIQUES FOR IMPROVED CONTROL CHANNELS

CROSS REFERENCES

The present application for patent claims priority to U.S. Provisional Patent Application No. 62/403,682 by YANG, et al., entitled "Techniques For Improved Control Channels," filed Oct. 3, 2016, assigned to the assignee hereof.

BACKGROUND

The following relates generally to wireless communication, and more specifically to techniques for improved control channels.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE). A base station may communicate with UEs on downlink channels (e.g., for transmissions from a base station to a UE) and uplink channels (e.g., for transmissions from a UE to a base station).

A base station may provide downlink control information (DCI) to one or more UEs that the base station serves. The UEs may use the DCI to determine information for communicating with the base station, including the location of resources that carry data for the UE, the modulation and coding scheme (MCS) used by the based station, information used for UE power control, requests from the base station for information or measurements taken by the UE, and so on. The DCI may be mapped to a downlink control channel (e.g., a physical downlink control channel (PDCCH)) for transmission to UEs. The PDCCH may be allocated to one or more control channel elements (CCEs) in a control region of a downlink transmission sent to the UEs. The number of CCEs to which the PDCCH is mapped may be referred to the aggregation level. The combination of CCEs at the various possible aggregation levels may be denoted as a search space, and each CCE/aggregation level combination to be searched in the search space may be referred to as a PDCCH candidate.

The UEs may monitor the control region, attempting to decode a PDCCH transmission for the UE at various PDCCH candidates in the PDCCH search space. Since the PDCCH search space for a control region may contain many PDCCH candidates, the receiving UE may expend significant resources unsuccessfully attempting to decode a PDCCH for the UE, at the various PDCCH candidates, inefficiently using limited UE resources.

In addition, current control channel techniques allow for a large number of possible DCI formats, of varying bit lengths, to be sent via a PDCCH. A receiving UE, attempting to decode the PDCCH, also checks for each of the various DCI formats in the PDCCH search space, adding to the resource burden placed on the UE, for the UE to successfully receive DCI from the base station.

The above-described CCEs may each include multiple resource element groups (REGs) made up for a number of resource elements. Current techniques to order REGs within a control region, and allocate REGs to CCEs, may provide for low tolerance of poor channel conditions. As a result, improved REG ordering techniques may be beneficial.

SUMMARY

The described techniques relate to improved methods, systems, devices, or apparatuses that support improved control channels.

A control channel search space may include multiple control channel candidates, and may be organized according to a nested structure. The nested structure may constrain the location of the search space such that a first portion of the search space, associated with a lower aggregation level, may be a subset of a second portion of the search space, associated with a higher aggregation level. Alternatively a first portion of the search space for a higher aggregation level may be made up of control channel candidates associated with the search space of a lower aggregation level. When receiving a control transmission from a base station, a user equipment (UE) searches the control transmission using the control channel search space organized according to a nested structure, for a control channel. The base station may have used the aggregation level for the control channel for the UE, and the nested structure for the control channel search space, to map the control channel to one or more control channel elements (CCEs) for transmission.

A control channel transmission may include multiple resource element groups (REGs), that are organized into one or more CCEs. A base station may reorder the REGs based on a transmission mode that will be used by the base station to transmit the control channel to a UE. If the base station determines that the control channel transmission will be broadcast or multicast, the base station may reorder the REGs. If the control channel transmission will be beamformed unicast, the base station may refrain from reordering the REGs. A receiving UE may determine the transmission mode used, and reorder, or refrain from reordering, the REGs in a received control channel transmission based on the determined transmission mode.

A UE may also decode a received control channel transmission where the DCI formats may be constrained to be an integer multiple of a predetermined base number of bits N. The UE may attempt decoding of the control channel transmission using the set of DCI formats to obtain DCI for the UE, assuming that the DCI format has a length that is a multiple of N.

A method of wireless communication is described. The method may include receiving a control transmission from a base station, identifying a control channel search space that is organized according to a nested structure, the control channel search space including a plurality of control channel candidates, where each of the plurality of control channel candidates is associated with one or more CCEs and an aggregation level, and searching the received control transmission to identify a control channel for the UE using the plurality of control channel candidates.

An apparatus for wireless communication is described. The apparatus may include means for receiving a control transmission from a base station, means for identifying a control channel search space that is organized according to a nested structure, the control channel search space including a plurality of control channel candidates, where each of the plurality of control channel candidates is associated with one or more CCEs and an aggregation level, and means for searching the received control transmission to identify a control channel for the UE using the plurality of control channel candidates.

Another apparatus for wireless communication is described. The apparatus may include a processor and memory coupled to the processor. The processor may be configured to receive a control transmission from a base station, identify a control channel search space that is organized according to a nested structure, the control channel search space including a plurality of control channel candidates, where each of the plurality of control channel candidates is associated with one or more CCEs and an aggregation level, and search the received control transmission to identify a control channel for the UE using the plurality of control channel candidates.

A non-transitory computer readable medium for wireless communication is described. The non-transitory computer-readable medium may store instructions executable by a processor to receive a control transmission from a base station, identify a control channel search space that is organized according to a nested structure, the control channel search space including a plurality of control channel candidates, where each of the plurality of control channel candidates is associated with one or more CCEs and an aggregation level, and search the received control transmission to identify a control channel for the UE using the plurality of control channel candidates.

In some examples of the method, apparatus, and non-transitory computer-readable medium described above, a lower aggregation level search space includes one or more CCEs that may be a subset of a higher aggregation level search space.

In some examples of the method, apparatus, and non-transitory computer-readable medium described above, a higher aggregation level search space contains a sum of a plurality of lower aggregation level search spaces.

In some examples of the method, apparatus, and non-transitory computer-readable medium described above, the plurality of lower aggregation level search spaces contain one or more search spaces associated with a first aggregation level and one or more search spaces associated with a second aggregation level.

Some examples of the method, apparatus, and non-transitory computer-readable medium described above may further include processes, features, means, or instructions for decoding control channel candidates associated with the plurality of lower aggregation level search spaces. Some examples of the method, apparatus, and non-transitory computer-readable medium described above may further include processes, features, means, or instructions for generating log-likelihood ratio (LLR) information during the decoding. Some examples of the method, apparatus, and non-transitory computer-readable medium described above may further include processes, features, means, or instructions for decoding control channel candidates associated with the higher aggregation level search space based at least in part on the generated LLR information.

In some examples of the method, apparatus, and non-transitory computer-readable medium described above, the control channel search space may be based at least in part on whether the control transmission may be configured for uplink transmission or downlink transmission.

A method of wireless communication is described. The method may include identifying an aggregation level for a control channel for a UE, identifying a nested structure for a control channel search space, the control channel search space including a plurality of control channel candidates, where each of the plurality of control channel candidates is associated with one or more CCEs and an aggregation level, mapping the control channel to one or more CCEs of the control channel search space based at least in part on the aggregation level, and transmitting the control channel to the UE.

An apparatus for wireless communication is described. The apparatus may include means for identifying an aggregation level for a control channel for a UE, means for identifying a nested structure for a control channel search space, the control channel search space including a plurality of control channel candidates, where each of the plurality of control channel candidates is associated with one or more CCEs and an aggregation level, means for mapping the control channel to one or more CCEs of the control channel search space based at least in part on the aggregation level, and means for transmitting the control channel to the UE.

Another apparatus for wireless communication is described. The apparatus may include a processor and memory coupled to the processor. The processor may be configured to identify an aggregation level for a control channel for a UE, identify a nested structure for a control channel search space, the control channel search space including a plurality of control channel candidates, where each of the plurality of control channel candidates is associated with one or more CCEs and an aggregation level, map the control channel to one or more CCEs of the control channel search space based at least in part on the aggregation level, and transmit the control channel to the UE.

A non-transitory computer readable medium for wireless communication is described. The non-transitory computer-readable medium may store instructions executable by a processor to identify an aggregation level for a control channel for a UE, identify a nested structure for a control channel search space, the control channel search space including a plurality of control channel candidates, where each of the plurality of control channel candidates is associated with one or more CCEs and an aggregation level, map the control channel to one or more CCEs of the control channel search space based at least in part on the aggregation level, and transmit the control channel to the UE.

In some examples of the method, apparatus, and non-transitory computer-readable medium described above, a lower aggregation level search space includes one or more CCEs that may be a subset of a higher aggregation level search space.

In some examples of the method, apparatus, and non-transitory computer-readable medium described above, a higher aggregation level search space contains a sum of a plurality of lower aggregation level search spaces.

In some examples of the method, apparatus, and non-transitory computer-readable medium described above, the plurality of lower aggregation level search spaces contain one or more search spaces associated with a first aggregation level and one or more search spaces associated with a second aggregation level.

A method of wireless communication is described. The method may include receiving a control channel transmission from a base station that includes a plurality of REGs organized into one or more CCEs, identifying REG indices associated with the plurality of REGs, determining whether to reorder the REG indices based at least in part on a transmission mode associated with the control channel transmission, and decoding the control channel transmission based at least in part on the plurality of REG indices to generate a control channel.

An apparatus for wireless communication is described. The apparatus may include means for receiving a control channel transmission from a base station that includes a plurality of REGs organized into one or more CCEs, means for identifying REG indices associated with the plurality of REGs, means for determining whether to reorder the REG indices based at least in part on a transmission mode associated with the control channel transmission, and means for decoding the control channel transmission based at least in part on the plurality of REG indices to generate a control channel.

Another apparatus for wireless communication is described. The apparatus may include a processor and memory coupled to the processor. The processor may be configured to receive a control channel transmission from a base station that includes a plurality of REGs organized into one or more CCEs, identify REG indices associated with the plurality of REGs, determine whether to reorder the REG indices based at least in part on a transmission mode associated with the control channel transmission, and decode the control channel transmission based at least in part on the plurality of REG indices to generate a control channel.

A non-transitory computer readable medium for wireless communication is described. The non-transitory computer-readable medium may store instructions executable by a processor to receive a control channel transmission from a base station that includes a plurality of REGs organized into one or more CCEs, identify REG indices associated with the plurality of REGs, determine whether to reorder the REG indices based at least in part on a transmission mode associated with the control channel transmission, and decode the control channel transmission based at least in part on the plurality of REG indices to generate a control channel.

Some examples of the method, apparatus, and non-transitory computer-readable medium described above may further include processes, features, means, or instructions for reordering the indices associated with the REGs based at least in part on a bit-reversal de-interleaving procedure.

Some examples of the method, apparatus, and non-transitory computer-readable medium described above may further include processes, features, means, or instructions for reordering the indices associated with the REGs, where the transmission mode associated with the received control channel transmission contains broadcasting or multicasting.

Some examples of the method, apparatus, and non-transitory computer-readable medium described above may further include processes, features, means, or instructions for performing wide-band channel estimation independent of the reordering.

Some examples of the method, apparatus, and non-transitory computer-readable medium described above may further include processes, features, means, or instructions for refraining from reordering the indices associated with the REGs, where the identified transmission mode for the received control channel transmission contains beamformed unicasting.

Some examples of the method, apparatus, and non-transitory computer-readable medium described above may further include processes, features, means, or instructions for refraining from performing wide-band channel estimation.

A method of wireless communication is described. The method may include identifying a transmission mode for a control channel to be transmitted to one or more UEs identifying resource element group (REG) indices associated with a plurality of REGs for the control channel, determining whether to reorder the REG indices based at least in part on the identified transmission mode, and transmitting, using the identified transmission mode, the control channel including the REGs organized in the control channel based at least in part on the REG indices.

An apparatus for wireless communication is described. The apparatus may include means for identifying a transmission mode for a control channel to be transmitted to one or more UEs, means for identifying resource element group (REG) indices associated with a plurality of REGs for the control channel, means for determining whether to reorder the REG indices based at least in part on the identified transmission mode, and means for transmitting, using the identified transmission mode, the control channel including the REGs organized in the control channel based at least in part on the REG indices.

Another apparatus for wireless communication is described. The apparatus may include a processor and memory coupled to the processor. The processor may be configured to identify a transmission mode for a control channel to be transmitted to one or more UEs identify resource element group (REG) indices associated with a plurality of REGs for the control channel, determine whether to reorder the REG indices based at least in part on the identified transmission mode, and transmit, using the identified transmission mode, the control channel including the REGs organized in the control channel based at least in part on the REG indices.

A non-transitory computer readable medium for wireless communication is described. The non-transitory computer-readable medium may store instructions executable by a processor to identify a transmission mode for a control channel to be transmitted to one or more UEs, identify resource element group (REG) indices associated with a plurality of REGs for the control channel, determine whether to reorder the REG indices based at least in part on the identified transmission mode, and transmit, using the identified transmission mode, the control channel including the REGs organized in the control channel based at least in part on the REG indices.

Some examples of the method, apparatus, and non-transitory computer-readable medium described above may further include processes, features, means, or instructions for mapping one or more sets of REGs selected from the plurality of REGs to one or more CCEs of the transmitted control channel based at least in part on the indices.

Some examples of the method, apparatus, and non-transitory computer-readable medium described above may further include processes, features, means, or instructions for reordering the indices associated with the REGs based at least in part on a bit-reversal interleaving procedure.

Some examples of the method, apparatus, and non-transitory computer-readable medium described above may further include processes, features, means, or instructions for reordering the indices associated with the REGs, where the identified transmission mode for the control channel contains broadcasting or multicasting.

Some examples of the method, apparatus, and non-transitory computer-readable medium described above may further include processes, features, means, or instructions for refraining from reordering the indices associated with the REGs, where the identified transmission mode for the control channel contains beamformed unicasting.

A method of wireless communication is described. The method may include receiving a control channel transmission from a base station, identifying a plurality of downlink control information (DCI) formats, each DCI format having a bit length that is an integer multiple of a predetermined base number of bits, and decoding the control channel transmission based at least in part on the identified plurality of DCI formats to obtain DCI for the UE.

An apparatus for wireless communication is described. The apparatus may include means for receiving a control channel transmission from a base station, means for identifying a plurality of DCI formats, each DCI format having a bit length that is an integer multiple of a predetermined base number of bits, and means for decoding the control channel transmission based at least in part on the identified plurality of DCI formats to obtain DCI for the UE.

Another apparatus for wireless communication is described. The apparatus may include a processor and memory coupled to the processor. The processor may be configured to receive a control channel transmission from a base station, identify a plurality of DCI formats, each DCI format having a bit length that is an integer multiple of a predetermined base number of bits, and decode the control channel transmission based at least in part on the identified plurality of DCI formats to obtain DCI for the UE.

A non-transitory computer readable medium for wireless communication is described. The non-transitory computer-readable medium may store instructions executable by a processor to receive a control channel transmission from a base station, identify a plurality of DCI formats, each DCI format having a bit length that is an integer multiple of a predetermined base number of bits, and decode the control channel transmission based at least in part on the identified plurality of DCI formats to obtain DCI for the UE.

In some examples of the method, apparatus, and non-transitory computer-readable medium described above, the predetermined base number of bits associated with DCI formats for uplink data may be different that a second predetermined base number of bits associated with DCI formats for downlink data.

Some examples of the method, apparatus, and non-transitory computer-readable medium described above may further include processes, features, means, or instructions for receiving, from the base station, an indicator of a bit length for the DCI for the UE in a radio resource control message or in a control region of a downlink subframe.

In some examples of the method, apparatus, and non-transitory computer-readable medium described above, one or more DCI formats of the plurality of DCI formats contain a first DCI format portion and a second DCI format portion. In some examples of the method, apparatus, and non-transitory computer-readable medium described above, decoding the control channel transmission contains: decoding a first portion of the control channel transmission based at least in part on the first DCI format portion to obtain an indicator of a bit length of the second DCI portion format and to obtain a first portion of the DCI. Some examples of the method, apparatus, and non-transitory computer-readable medium described above may further include processes, features, means, or instructions for decoding a second portion of the control channel transmission based at least in part on the obtained indicator to obtain a second portion of the DCI.

Some examples of the method, apparatus, and non-transitory computer-readable medium described above may further include processes, features, means, or instructions for identifying that the UE may be configured with a grant associated with a number of transmission time intervals (TTIs), where a bit length of the obtained DCI for the UE may be based at least in part on the number of TTIs.

Some examples of the method, apparatus, and non-transitory computer-readable medium described above may further include processes, features, means, or instructions for identifying that the UE may be configured with a grant associated with a number of component carriers (CCs), where a bit length of the obtained DCI for the UE may be based at least in part on the number of CCs.

In some examples of the method, apparatus, and non-transitory computer-readable medium described above, identifying the plurality of DCI formats comprises: identifying the bit length based at least in part on radio resource control (RRC) signaling, a preamble, mini-control signaling, or some combination thereof.

A method of wireless communication is described. The method may include selecting, from among a plurality of DCI formats, a DCI format for a control channel transmission to be sent to a UE, each DCI format of the plurality of DCI formats having a bit length that is an integer multiple of a predetermined base value, encoding DCI for the UE, the DCI formatted according to the selected DCI format, and transmitting the encoded DCI to the UE in a control channel.

An apparatus for wireless communication is described. The apparatus may include means for selecting, from among a plurality of DCI formats, a DCI format for a control channel transmission to be sent to a UE, each DCI format of the plurality of DCI formats having a bit length that is an integer multiple of a predetermined base value, means for encoding DCI for the UE, the DCI formatted according to the selected DCI format, and means for transmitting the encoded DCI to the UE in a control channel.

Another apparatus for wireless communication is described. The apparatus may include a processor and memory coupled to the processor. The processor may be configured to select, from among a plurality of DCI formats, a DCI format for a control channel transmission to be sent to a UE, each DCI format of the plurality of DCI formats having a bit length that is an integer multiple of a predetermined base value, encode DCI for the UE, the DCI formatted according to the selected DCI format, and transmit the encoded DCI to the UE in a control channel.

A non-transitory computer readable medium for wireless communication is described. The non-transitory computer-readable medium may store instructions executable by a processor to select, from among a plurality of DCI formats, a DCI format for a control channel transmission to be sent to a UE, each DCI format of the plurality of DCI formats having a bit length that is an integer multiple of a predetermined base value, encode DCI for the UE, the DCI formatted according to the selected DCI format, and transmit the encoded DCI to the UE in a control channel.

In some examples of the method, apparatus, and non-transitory computer-readable medium described above, encoding the DCI for the UE includes: padding the DCI with one or more pad bits to fill at least a portion of the DCI format.

In some examples of the method, apparatus, and non-transitory computer-readable medium described above, encoding the DCI for the UE includes: inserting one or more cyclic redundancy check bits to fill at least a portion of the DCI format.

In some examples of the method, apparatus, and non-transitory computer-readable medium described above, encoding the DCI for the UE includes: inserting a copy of at least a portion of the DCI to fill at least a portion of the DCI format.

DETAILED DESCRIPTION

Figure 1:
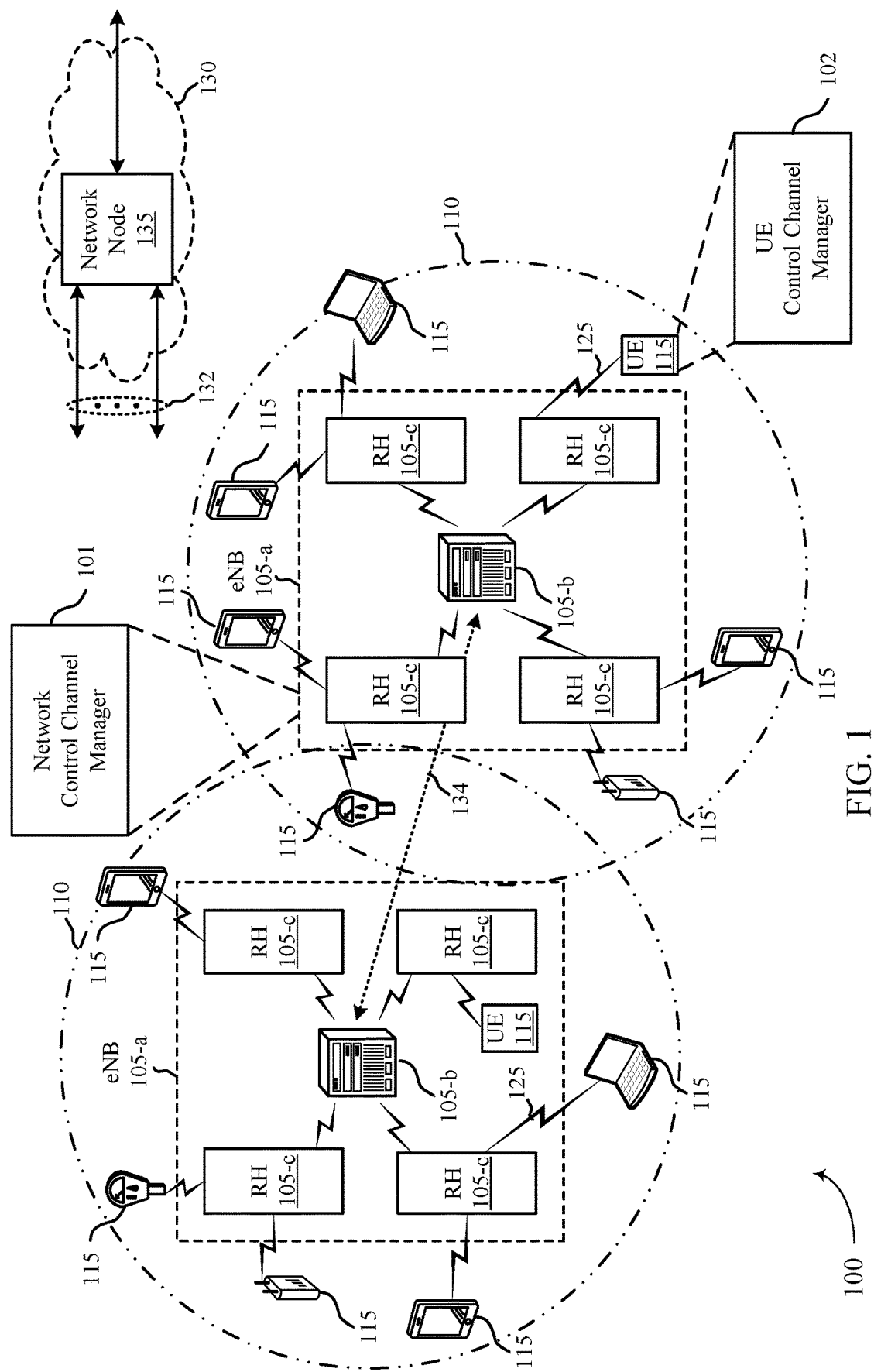
FIG. 1 illustrates an example of a wireless communication system that supports techniques for improved control channels in accordance with aspects of the present disclosure.

A control channel search space may include multiple control channel candidates and may be organized according to a nested structure. The nested structure may constrain the location of the search space, such that a first portion of the search space associated with a lower aggregation level may be a subset of a second portion of the search space associated with a higher aggregation level, organizing the search space according to a nested structure. The control channel search space may also use a nested structure, where a first portion of the search space for a higher aggregation level is made up of control channel candidates associated with the search space of a lower aggregation level. When receiving a control transmission from a base station, a user equipment (UE) may search the control transmission for a control channel for the UE, using the control channel search space organized according to a nested structure. The base station may have used the aggregation level for the control channel for the UE, and the nested structure for the control channel search space, to map the control channel to one or more control channel elements (CCEs) for a control channel transmission. The described nested structure for the search space may sacrifice some flexibility for the base station to transmit DCI, but may use fewer resources and enable faster control-channel processing at the UE when performing blind decoding, at least in part because the UE may reuse log-likelihood ratio (LLR) information generated during attempts to decode lower aggregation level control channel candidates when attempting to decode higher aggregation level control channel candidates.

A control channel transmission may also include multiple resource element groups (REGs) that are organized into one or more CCEs. A base station may reorder the REGs based on a transmission mode that will be used by the base station to transmit the control channel to a UE. If the base station determines that the control channel transmission will be broadcast or multicast, the base station may reorder the REGs. If the base station determines that the control channel transmission will be beamformed unicast, the base station may refrain from reordering the REGs. A receiving UE may determine the transmission mode used, and reorder, or refrain from reordering, the REGs in a received control channel transmission based on the determined transmission mode. Reordering of the REGs may improve error correction performance for broadcast or multicast transmissions through increased frequency diversity, where wide-band channel estimation performance is independent of the choice of reordering. However, when a beamformed unicast transmission mode is used, wide-band channel estimation may not be done, unless the REGs are not reordered. Thus a base station may selectively reorder REGs based on the transmission mode to obtain increased performance through better channel estimation.

A UE may also decode a received control channel transmission based, at least in part, on a set of downlink control information (DCI) formats that are quantized. The DCI formats may be constrained to an integer multiple of a predetermined base number of bits N. The UE may attempt to decode the control channel transmission using the set of DCI formats to obtain DCI for the UE, assuming that the DCI format for the DCI has a length that is a multiple of N. Alternate values of N may be used for uplink data DCI formats and downlink data DCI formats. The DCI formats may also share a number of bits, such that a first multiple of N bits may be common among different DCI formats, and the remaining multiple of N bits may be different among the different DCI formats. The sizes of the DCI for a UE may be transmitted to the UE in RRC signaling, or through a preamble, mini-control, or other control channel signaling to indicate a DCI format size. The DCI formats may be part of a two-part DCI design, where the first DCI format has a fixed size and indicates the length of the second DCI format. When the number of DCI bits in the quantized DCI format is less than the number of bits of the DCI format, the remaining bits may be pad bits, or additional cyclic redundancy check (CRC) bits, or may be redundant versions of portions of the DCI. By decreasing the number of different DCI format lengths, the UE may more rapidly decode a received control channel, using fewer computation resources and increasing control channel decoding speed.

Aspects of the disclosure are initially described in the context of a wireless communications system. Examples of wireless communication systems employing techniques for improved control channels, in addition to example DCI configurations and search space structures, are then described. Aspects of the disclosure are further illustrated by, and described with reference to, apparatus diagrams, system diagrams, and flowcharts that relate to techniques for improved control channels.

FIG. 1 illustrates an example of a wireless communication system 100, in accordance with various aspects of the disclosure. The wireless communication system 100 may include network devices 105 (which may also be referred to as base stations herein), UEs 115, and a core network 130. Wireless communication system 100 may support dynamic RO and TO configurations to enable reduced latency and reduced power consumption. For example, wireless communication system 100 may support a TO following the reception of data during the on duration of a DRX configuration. Additionally or alternatively, a subsequent RO may follow the transmission of data during the on duration of a DTX configuration.

The core network 130 may provide user authentication, access authorization, tracking, Internet Protocol (IP) connectivity, and other access, routing, or mobility functions. At least some of the network devices 105 (e.g., network device 105-*a*, which may be an example of an eNB or a base station, or network device 105-*b*, which may be an example of an access node controller (ANC)) may interface with the core network 130 through backhaul links 132 (e.g., S1, S2, etc.) and may perform radio configuration and scheduling for communication with the UEs 115. In various examples, the network devices 105-*b* may communicate, either directly or indirectly (e.g., through core network 130), with each other over backhaul links 134 (e.g., X1, X2, etc.), which may be wired or wireless communication links.

Each network device 105-*b* may also communicate with a number of UEs 115 through a number of other network devices 105-*c*, where network device 105-*c* may be an example of a smart radio head. In alternative examples, various functions of each network device 105 may be distributed across various network devices 105 (e.g., radio heads and access network controllers) or consolidated into a single network device 105 (e.g., a base station).

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the network devices 105-*a* and/or network devices 105-*c* may have similar frame timing, and transmissions from different network devices 105-*a* and/or network devices 105-*c* may be approximately aligned in time. For asynchronous operation, the network devices 105-*a* and/or network devices 105-*c* may have different frame timings, and transmissions from different network devices 105-*a* and/or network devices 105-*c* may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device 105-*c*, network device 105-*b*, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, a IoE device, or the like. A UE may be able to communicate with various types of network devices 105-*a*, network devices 105-*c*, base stations, access points, or other network devices, including macro eNBs, small cell eNBs, relay base stations, and the like. A UE may also be able to communicate directly with other UEs (e.g., using a peer-to-peer (P2P) protocol).

The communication links 125 shown in wireless communication system 100 may include uplink (UL) channels from a UE 115 to a network device 105-*c*, and/or DL channels, from a network device 105-*c* to a UE 115. The downlink channels may also be called forward link channels, while the uplink channels may also be called reverse link channels. Control information and data may be multiplexed on an uplink channel or downlink according to various techniques. Control information and data may be multiplexed on a downlink channel, for example, using TDM techniques, FDM techniques, or hybrid TDM-FDM techniques. In some examples, the control information transmitted during a TTI of a downlink channel may be distributed between different control regions in a cascaded manner (e.g., between a common control region and one or more UE-specific control regions).

One or more of network devices 105 may include a network control channel manager 101, which may coordinate network aspects of techniques for improved control channels as described herein. UEs 115 may include a UE control channel manager 102, which may coordinate network aspects of techniques for improved control channels as described herein. In some cases, network control channel manager 101 may be an example of the base station control channel manager 1215 described below with reference to FIG. 12, and UE control channel manager 102 may be an example of the UE control channel manager 815 described below with reference to FIG. 8.

In some cases, a UE 115 may monitor a wireless link 125 continuously for an indication that the UE 115 may receive data. In other cases (e.g., to conserve power and extend battery life) a UE 115 may be configured with a DRX or DTX cycle. A DRX cycle consists of an "on duration" when the UE 115 may monitor for control information (e.g., on PDCCH) and a "DRX period" when the UE 115 may power down radio components. A DTX cycle consists of an "on duration" when the UE 115 may transmit a scheduling request and a "DTX period" when the UE 115 may power down radio components. In some cases, a UE 115 may be configured with a short DRX or DTX cycle and a long DRX or DTX cycle. In some cases, a UE 115 may enter a long DRX or DTX cycle if inactive for one or more short DRX or DTX cycles. The transition between the short DRX or DTX cycle, the long DRX or DTX cycle and continuous reception may be controlled by an internal timer or by messaging from a network device 105.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (i.e., where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration. A shorter symbol duration is associated with increased subcarrier spacing. A device, such as a UE 115 or network device 105, utilizing eCCs may transmit wideband signals (e.g., 20, 40, 60, 80 Mhz, etc.) at reduced symbol durations (e.g., 16.67 microseconds). A TTI in eCC may consist of one or multiple symbols. In some cases, the TTI duration (that is, the number of symbols in a TTI) may be variable. In some cases, an eCC may utilize a different symbol duration than other CCs, including use of a reduced symbol duration as compared with symbol durations of the other CCs. A shorter symbol duration is associated with increased subcarrier spacing. A device, such as a UE 115 or network device 105, utilizing eCCs may transmit wideband signals (e.g., 20, 40, 60, 80 Mhz, etc.) at reduced symbol durations (e.g., 16.67 microseconds). A TTI in eCC may consist of one or multiple symbols. In some cases, the TTI duration (that is, the number of symbols in a TTI) may be variable.

Figure 2:
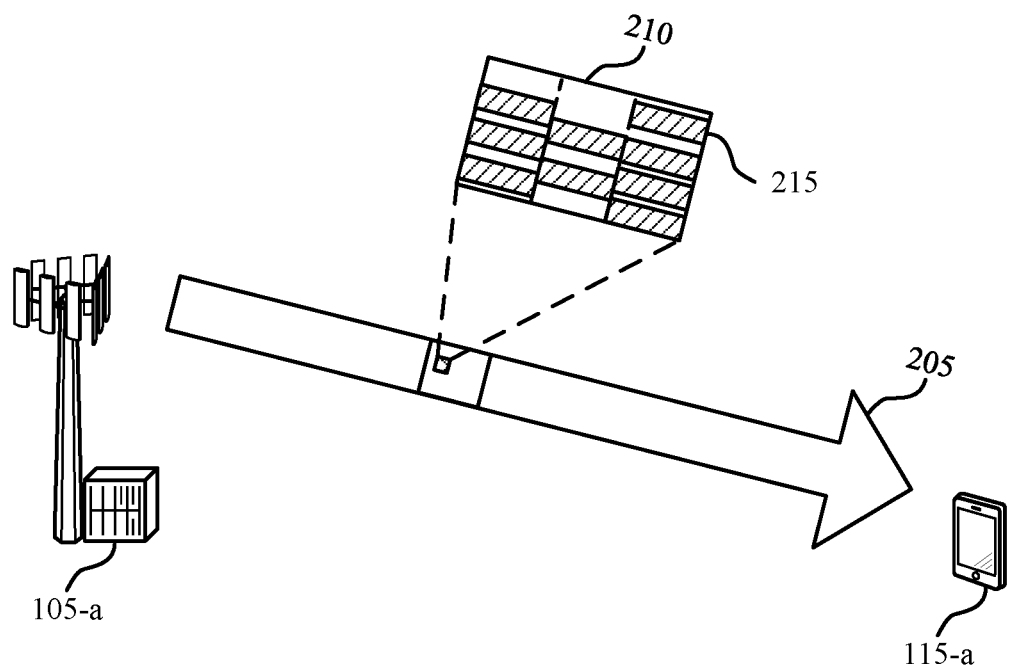
FIG. 2 illustrates an example of a wireless communication system that supports techniques for improved control channels in accordance with aspects of the present disclosure.

FIG. 2 illustrates an example of a wireless communication system 200 that supports improved control channel techniques. Wireless communications system 200 may support techniques for improved control channel design (e.g., of control channel 205) to provide for more efficient processing timelines in addition to facilitating increased performance (e.g., in beamformed unicast control signaling scenarios). For example, new search space structures may improve control information processing performance (e.g., demodulation and decoding speed and resource utilization at UE 115-*a*). Additionally or alternatively, resource element group (REGs) 215 reordering may improve channel estimation for control signals. In some cases, reordering REGs (e.g., via a bit-reversal interleaver) prior to CCE (e.g., CCE 210) mapping may increase frequency diversity and thus improve channel estimation. In other cases, for example, when beamformed unicast control signaling is used, the order of REG indices may be maintained and mapped sequentially to CCEs 210. Finally, a nested search space organization for a control region that includes DCI and/or quantized DCI format lengths may facilitate future extension into developing wireless communication systems, and further improve control channel processing time and reducing processing resource utilization.

In some wireless communication systems (e.g., LTE systems), control channel design may be based around a minimum set of resource elements (e.g., a REG). A network device 105 may group REGs into CCEs, which may then be further aggregated into aggregation levels (ALs). For example, a lowest AL may include a single CCE, and a higher AL may include two, four, eight, or more CCEs. In some cases, different ALs may result in different error correction performance by adapting AL schemes to UEs 115 experiencing different channel conditions. For example, network device 105-*a* may conform to a search space in terms of confining the location of a control channel (e.g., a PDCCH) to a CCE 210 or group of CCEs 210 (e.g., mapping CCEs according to ALs). Location limitations of CCE 210 may improve UE 115-*a* searching efficiency. That is, UE 115-*a* may experience improved blind decoding (e.g., from the resulting reduced number of blind hypothesis to check) of the potential locations of CCEs 210. Different search space structures, or AL schemes, may provide for improved scheduling flexibility (e.g., network device 105-*a* control scheduling) and/or improved UE 115 processing timelines, as discussed below with reference to FIGS. 3-4.

One or more REGs 215 may be defined in the order of a RB. RB ordered REGs 215 may be mapped or aggregated together to form CCEs 210, used by UE 115-*a* for channel estimation. Reference signals may spread across a communication bandwidth at a fixed density, with each REG 215 being associated with one or more reference signals. The reference signals defined in the frequency region spanned by different REGs 215 may be used to estimate the channel associated with the particular REG 215. In some cases, REG indices may be reordered (e.g., via a bit-reversal interleaver) prior to being mapped to CCEs 210, such that frequency diversity is increased and thus, channel estimation and/or REG decoding may be improved. That is, tones may be demodulated with better channel estimation performance when REGs 215 are reordered to increase frequency diversity. For example, in wireless communication systems that configure a small number of symbols for control (e.g., 1 or 2 symbols), it may be desirable to employ such reordering to explore an increased frequency diversity in the reduced look in time associated with the small number of control symbols. Table 1 shows an example of bit-reversal interleaving for REG reordering and CCE mapping.

| REG Index | REG Binary Index | Reordered REG Binary Index (after bit-reversal) | Reordered REG Index | CCE Mapping |
|---|---|---|---|---|
| 0 | 0000 | 0000 | 0 | CCE1 |
| 1 | 0001 | 1000 | 8 | CCE1 |
| 2 | 0010 | 0100 | 4 | CCE1 |
| 3 | 0011 | 1100 | 12 | CCE1 |
| 4 | 0100 | 0010 | 2 | CCE2 |
| 5 | 0101 | 1010 | 10 | CCE2 |
| 6 | 0110 | 0110 | 6 | CCE2 |
| 7 | 0111 | 1110 | 14 | CCE2 |
| 8 | 1000 | 0001 | 1 | CCE3 |
| 9 | 1001 | 1001 | 9 | CCE3 |
| 10 | 1010 | 0101 | 5 | CCE3 |
| 11 | 1011 | 1101 | 13 | CCE3 |
| 12 | 1100 | 0011 | 3 | CCE4 |
| 13 | 1101 | 1011 | 11 | CCE4 |
| 14 | 1110 | 0111 | 7 | CCE4 |
| 15 | 1111 | 1111 | 15 | CCE4 |

As illustrated in the example of Table 1, REGs indices may be represented in binary for bit-reversal interleaving. Each CCE may, in the example of Table 1, contain 4 REGs. For example, an REG with an REG index of 3 may be associated with an REG binary index of 0011. Bit-reversal interleaving may flip or toggle each bit, such that is become 0s and 0s become 1s, thus the REG binary index of 0011 may translate to a reordered REG binary index of 1100 after interleaving. Finally, the reoredered REG binary index of 1100 may be associated with a reordered REG index of 12. By analogy, the 16 REGs may be reordered as shown in the reordered REG index column of Table 1. Reordering REGs as such may result in a desired spacing of consecutive REGs such that channel quality estimates of their associated tones may be averaged (e.g., as some tones may be associated with good and bad channel conditions). Bit-reversal interleaving, as described above, may separate REGs within a CCE as far away from each other as possible in an evenly spaced manner. In other examples, each CCE may contain a different number of REGs, for example two or six REGs per CCE. In yet other examples, other interleaving techniques or schemes may be used to reorder the REGs prior to CCE mapping.

In some wireless communication systems (e.g., wireless communication systems supporting beamformed control signaling), REGs 215 may not be reordered, it may be desirable to maintain sequential REGs 215 corresponding to the same CCE 210. Maintaining REG indices in such scenarios may result in increased channel estimation performance. For example, if CCE 1 includes REGs 0-3, the reference signal associated with REGs 0-3 may be combined for stronger channel estimation performance, as REGs 0-3 may be continuous in frequency. In wireless communication systems supporting beamformed control transmission, it may be desirable for each CCE to correspond to consecutive REGs such than associated reference signals may be combined for stronger channel estimation performance.

Wireless communication system 200 may also support nested DCI and/or quantized DCI lengths. In some cases, the DCI may describe which bits correspond to control information. Some wireless communication systems may designate numerous DCI options or formats to account for DCI of varying length. In some cases, wireless communication system 100 may quantize the lengths for DCI lengths or formats. Rules for such quantization may facilitate UE 115-*a* processing of DCI as well as enable future extension into newly developed wireless communication systems. For example, DCI lengths may be limited to integer multiples of some length constant, N. The length constant (e.g., a predetermined base number of bits) may be separately managed for DCI corresponding to uplink data and DCI corresponding to downlink data. In some cases, the DCI format length may exceed the actual size of the DCI to be conveyed by the DCI format length (e.g., the number of bits to be conveyed may be less than a quantized DCI length). In such scenarios, additional or remaining bits in the quantized length may include zero-padding, additional cyclic redundancy check (CRC) bits, or repeated information bits. The size of the DCI (e.g., number of bits needed for DCI) may be conveyed by network device 105-*a* through RRC signaling (e.g., semi-static signaling), a preamble, mini-control, or PCFICH like signaling. Additionally or alternatively, a two-part or two-stage DCI design may be implemented by wireless communication system 100. A first DCI size may be fixed (e.g., known by both network device 105-*a* and UE 115-*a*) and may indicate the length of a second DCI. That is, the first DCI size may be known by UE 115-*a* and may include an indication of a second DCI length, corresponding to a DCI length that facilitates transmission of the remaining DCI from network device 105-*a*. If UE 115-*a* is configured with multi-TTI grant or multi-CC grant, the size of the DCI may be a function of the number of CCs and/or the number of TTIs to be scheduled together. Examples of such nested DCI and quantized DCI lengths are further illustrated and described with reference to FIG. 5.

Figure 3:
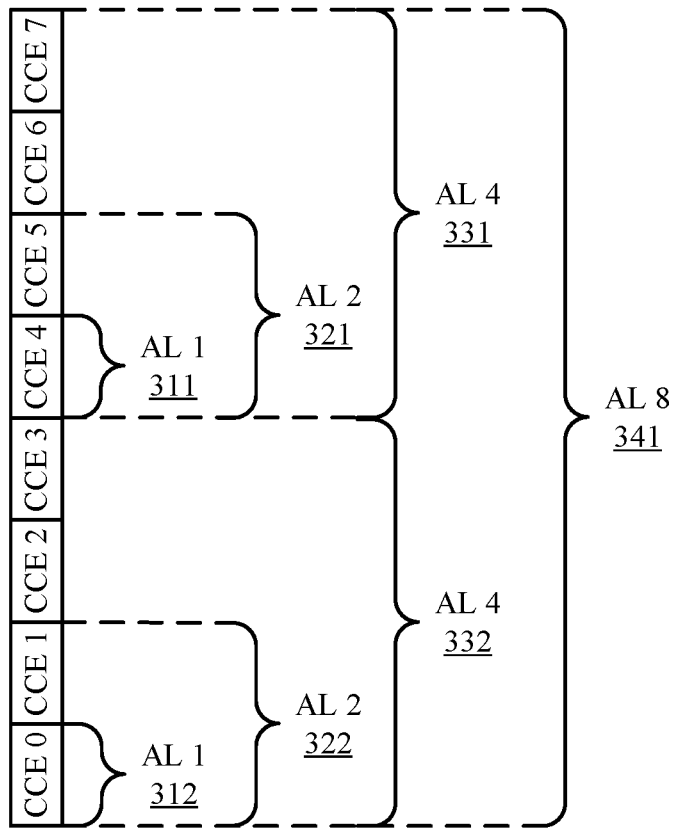
FIG. 3 illustrates an example of a search space structure that supports techniques for improved control channels in accordance with aspects of the present disclosure.

FIG. 3 illustrates an example of a search space structure 300 that enables improved control channel techniques. A network device 105 may use a search space structure 300, such that the network device 105 may transmit a control channel in one or more CCEs that are restricted to some locations for a given AL. Search space structure 300 illustrates a search space structure that facilitates UE 115 control information searching (e.g., due to the limitations on where CCEs may be located). A UE 115 may search locations for a control channel, including DCI for the UE, based on the UE's knowledge of the search space structure, which may be predetermined or pre-agreed upon between a network device 105 and UE 115. For example, if a control message is transmitted using AL 1, the control message from a network device 105 takes up one CCE and may be located in either CCE 0 or CCE 4 (e.g., AL 1 311 or AL 1 312). The UE 115 may therefore limit its search of control channel candidates at AL 1 to CCE 0 and CCE 4, as supposed to searching each of CCE 0 through CCE 7 at AL 1. Further, if a network device 105 wants to send an AL 4 control channel message to a UE 115, the network device 105 may be confined to schedule the message within CCE 0 through CCE 3 (e.g., AL 4 332) or within CCE 4 through CCE 7 (e.g., AL 4 331). Upon reception, the UE 115 may use blind decoding (e.g., check blind hypothesis) to search the control channel candidates located at CCE 0 through CCE 3 (e.g., AL 4 332) or CCE 4 through CCE 7 to attempt to find and/or find the AL 4 control message.

In search space structure 300, the search space for lower ALs is a subset of higher ALs. Such a structure may improve UE 115 control processing timelines by facilitating the reuse of acquired log-likelihood ratio (LLR) information for subsequent decoding. To process control information, a UE 115 may demodulate the received information to obtain a set of LLRs. A decoder may then utilize the collection of LLRs for blind decoding. Therefore, UE 115 may reuse some of the LLRs previously obtained for blind decoding of the lower ALs to achieve a higher AL decoding rate (e.g., as the lower ALs are a subset of the higher AL). For example, UE 115 may receive a control region (e.g., a number of CCEs), and may perform blind decoding on different combinations of the two AL 1s, two AL 2s, two AL 4s, and one AL 8. In some cases, the UE 115 may need to decode one or more of the different combinations. However, according to the search space structure 300, if UE 115 has already performed blind decoding for AL 1 (e.g., has already obtained LLRs corresponding to CCE 0 and CCE 4), the LLRs may be used subsequently when the UE 115 attempts to blind decode on AL 2, because the AL 2 contains AL 1 as a subset. That is, the obtained LLR (e.g., data bits for decoding) for CCE 0 (e.g., AL 1 312) may be reused by UE 115 for decoding of AL 2 322, as AL 1 312 is a subset of AL 1 322 and CCE 0 has already been decoded. Such reuse of LLRs may improve the efficiency of UE 115 control channel decoding and processing.

In some cases, definitions or destinations within a search space structure may be based on whether the DCI is configured for uplink or downlink transmission. Structures or locations within a search space differentiated based on whether the DCI is associated with uplink transmission or downlink transmission, and may further reduce UE 115 hypothesis testing when looking for DCI. The design and methods described above may applicable to both UE-specific search spaces and common search spaces. Further, wireless communication systems may employ altered search space structures (e.g., with a different number of CCEs and/or ALs) that may utilize described techniques appropriately modified for more or fewer CCEs and/or ALs.

Figure 4:
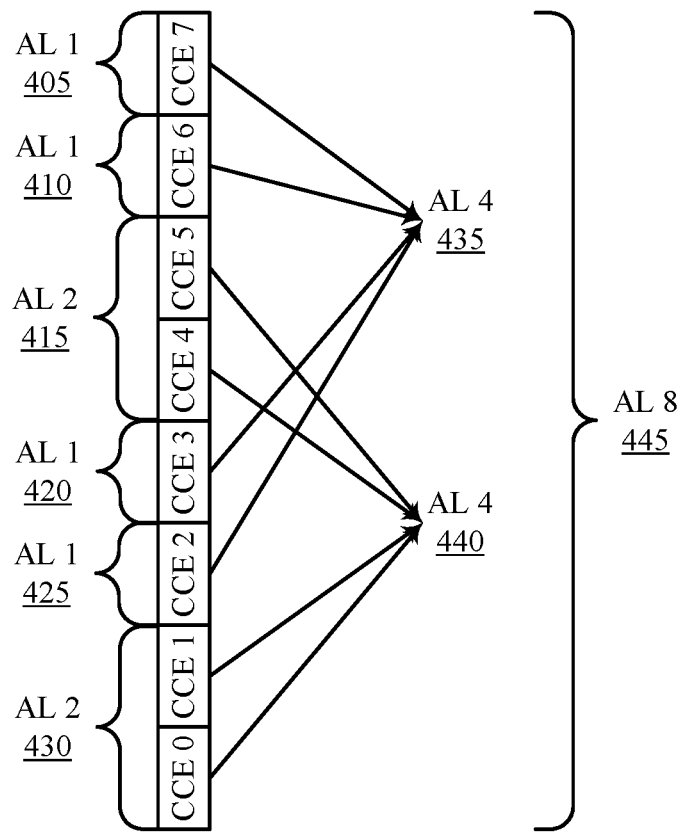
FIG. 4 illustrates an example of a search space structure that supports techniques for improved control channels in accordance with aspects of the present disclosure.

FIG. 4 illustrates an example of a search space structure 400 that enables improved control channel techniques. A network device 105 may use a search space structure such that the network device 105 may transmit a control channel in one or more CCEs that are restricted to locations for a given AL. Search space structure 400 illustrates an alternative AL scheme that facilitates UE 115 control information searching (e.g., due to the limitations on where CCEs may be located) while providing increased scheduling at a the network device 105. In the present example. a UE 115 may search locations (e.g., control channel candidates) of a control channel for the network device 105 conveying DCI, based on the search space or AL defined by search space structure 400, which may be predetermined or pre-agreed upon between a network device 105 and UE 115.

Search space structure 400 illustrates an example of scheme where control channel candidates for higher ALs include the sum of control channel candidates for lower ALs, with the exception of AL 1 and AL 2. That is, control channel candidates for AL 4 may include the sums of control channel candidates for lower ALs (e.g., AL 4 435 may include AL 1 405, AL 1 410, AL 1 420, and AL 1 425, the sum of AL 1 and AL 4 440 may include AL 2 415 and AL 2 430, the sum of AL 2) and AL 8 may include the sum of AL 4 (e.g., AL 8 445 may include AL 4 435 and AL 4 440, the sum of AL 4). Similar advantages in UE 115 control processing, as discussed above with reference to FIG. 3, may be realized in the present example. LLRs obtained for decoding control channel candidates at lower ALs may again be used when attempting to decode control channel candidates at higher ALs. For example, because the AL 4 440 contains the sum of AL 2, one or more of the LLRs used to decode CCE 0, CCE 1, CCE 4, and CCE 5 (e.g., CCEs corresponding to AL 2) may be reused for decoding of AL 4 440. However, a network device 105 may have increased control scheduling flexibility as compared to the example of FIG. 3 (e.g., due to the increased potential locations for AL 1 messages). LLRs associated with AL 1 may not be reused to decode AL 2 in the present example, however the network device 105 may benefit from the increased flexibility to schedule control information in CCE 2, CCE 3, CCE 6, and CCE 7 (e.g., compared to CCE 0 and CCE 4 of the previous example).

As discussed above, the search space structure definition or potential CCE destinations within a search space structure may be based on whether the DCI is configured for uplink transmission or downlink transmission. The search space design and techniques described above may be applicable to both UE-specific search spaces and common search spaces. Further, wireless communication systems may employ altered search space structures (e.g., with a different number of CCEs and/or ALs) that may utilize described techniques by analogy.

Figure 5A:
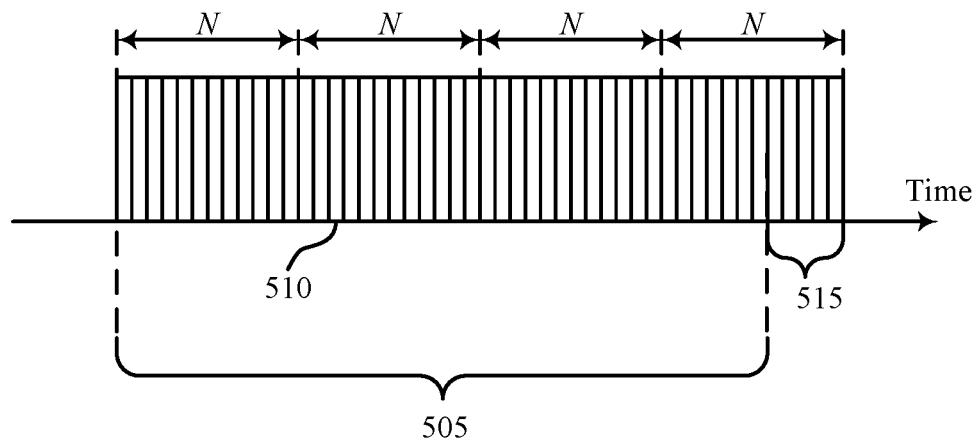
FIGS. 5A and 5B illustrate examples of DCI configurations that support techniques for improved control channels in accordance with aspects of the present disclosure.

FIG. 5A illustrates an example of a DCI configuration 501 that enables improved control channel techniques. A network device 105 may transmit numerous DCI types (e.g., depending on the needed DCI length). Different DCI types may be transmitted using different DCI formats with different possible bit lengths. A receiving UE 115 may be unaware of the type of DCI sent, and may need to test many blind hypotheses. In some cases, due to the large number of DCI possibilities, the UE 115 may be prone to false alarms or false positives during the blind hypothesis testing. As demonstrated in the present example, the DCI length may be restricted to reduce DCI ambiguity at the UE 115 receiver.

For example, the DCI length (e.g., the length applicable to a given DCI format) may be restricted to multiples of a predetermined base number of bits or a length constant, N. That is, possible DCI lengths may include 1N, 2N, 3N, etc. In the present example, if N=12, the DCI length in bits may be 12, 24, 36, 48, etc. depending on the number of bits 510 needed for a network device 105 to convey the DCI. In some cases, the length constant may be separately managed for DCI corresponding to uplink data and DCI corresponding to downlink data. For example, the DCI length for uplink may be N, while the DCI length for downlink may be M.

In some cases, the DCI length or DCI format may exceed the DCI size 505 when the number of bits to be conveyed is between quantized DCI lengths. For example, if the predetermined base number of bits is 12 (e.g., N=12) and the DCI size 505 is 43 bits, a DCI format 4N may be selected by a network device 105. In such scenarios, the 5 additional or remaining bits (e.g., remainder bits 515) in the quantized length may include zero-padding, additional cyclic redundancy check (CRC) bits, or repeated information bits (e.g., repetitions of a portion of the DCI). The DCI size 505 may be conveyed by network device 105 through RRC signaling (e.g., semi-static signaling), a preamble, mini-control, or PCFICH like signaling.

Figure 5B:
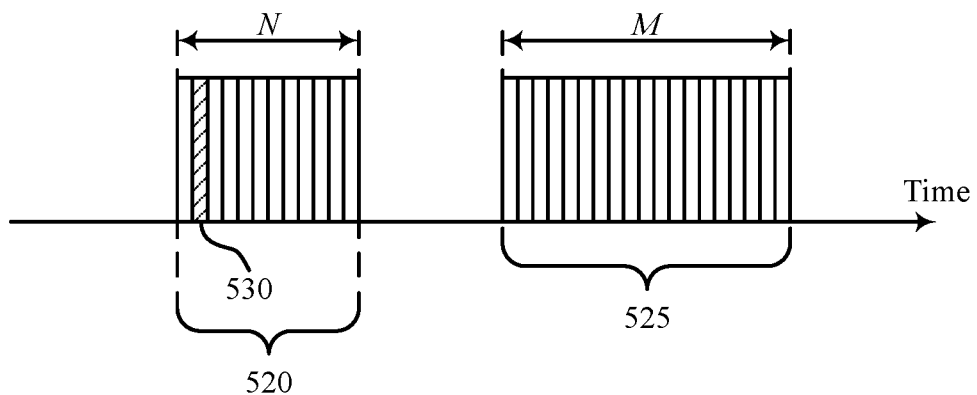

FIG. 5B illustrates an example of a DCI configuration 502 that enables improved control channel techniques. A two-part or two-stage DCI design may be implemented by a wireless communication system. The first DCI (e.g., first-stage DCI 520) may have a length of N, predetermined and known by both a network device 105 and a UE 115. First-stage DCI 520 may include one or more indication bits (e.g., second-stage length indicator 530, which may be one or more bits in length) to indicate the length of a second DCI (e.g., second-stage DCI 525). In the present example indicator 530 may indicate a length of M for second-stage DCI 525. In some cases, the indication may include multiple bits to indicate the length of the second DCI. The size of second-stage DCI (e.g., M) may depend on the amount of DCI remaining after the network device 105 transmits the first-stage DCI 520. As an alternative to the scenario described above, if a UE 115 is configured with a multi-TTI grant or multi-component carrier (CC) grant, the length may be based on a function of a number of CCs or the number of TTIs scheduled together. In such cases, a second-stage DCI 525 may or may not be necessary.

Figure 6:
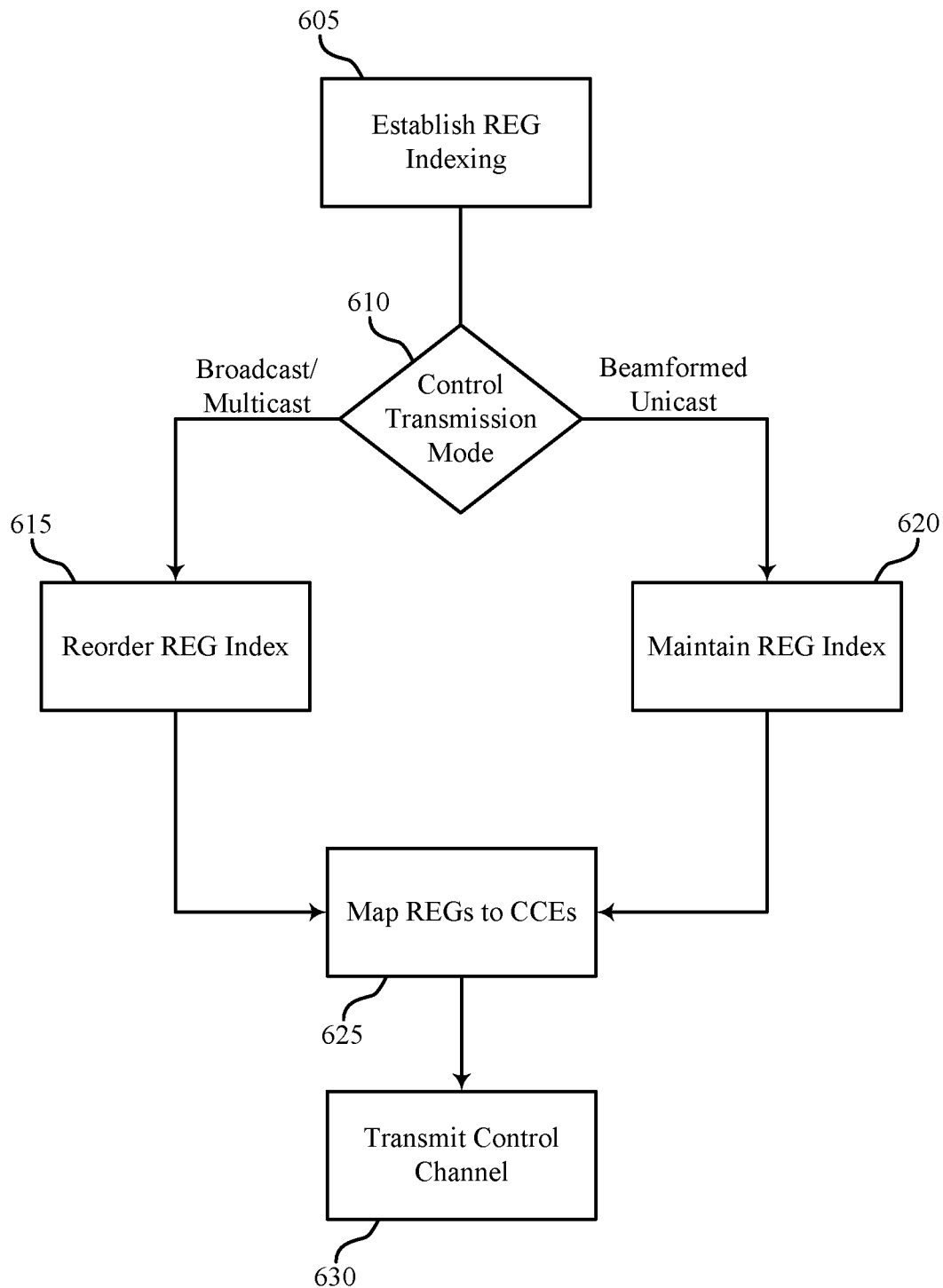
FIG. 6 illustrates an example of a method flow that supports techniques for improved control channels in accordance with aspects of the present disclosure.

FIG. 6 illustrates an example of a method flow 600 of techniques for improved control channel performance by a network device 105. At 605, a network device 105 may index a set of REGs (e.g., establish REG indexing). The network device 105 may then identify a transmission mode (e.g., a type of control transmission) to be used to send control information (e.g., DCI) to a UE 115. For example, the network device 105 may determine if the control transmission will be sent via a broadcast, multicast, and/or beamformed unicast transmission mode. If the control transmission will be sent as a broadcast or multicast transmission, network device 105 may reorder REG indices (e.g., via bit-reversal interleaving techniques described above) at 615. In contrast, if the control transmission will be sent as a beamformed unicast transmission, network device 105 may maintain the REG indices at 620 (e.g., established at 605), refraining from reording the REG indices.

Following the decision of whether or not to reorder the REG indexing (e.g., after either 615 or 620), the network device 105 may map the REGs to one or more CCEs. For example, with reference to Table 1, the base station may use the first column (REG index) for CCE mapping at 620. The network device 105 may use the fourth column (Reordered REG index) for CCE mapping at 615. That is, REGs 0-3 may be mapped to CCE 1 in the beamformed unicast control scenario (e.g., at 620) whereas REG 0, REG 8, REG 4, and REG 12 may be mapped to CCE 1 in the broadcast/multicast control scenario (e.g., at 615). Following the mapping of REGs to CCEs at 625, the network device 105 may transmit the control channel transmission in the CCEs at 630.

Figure 7:
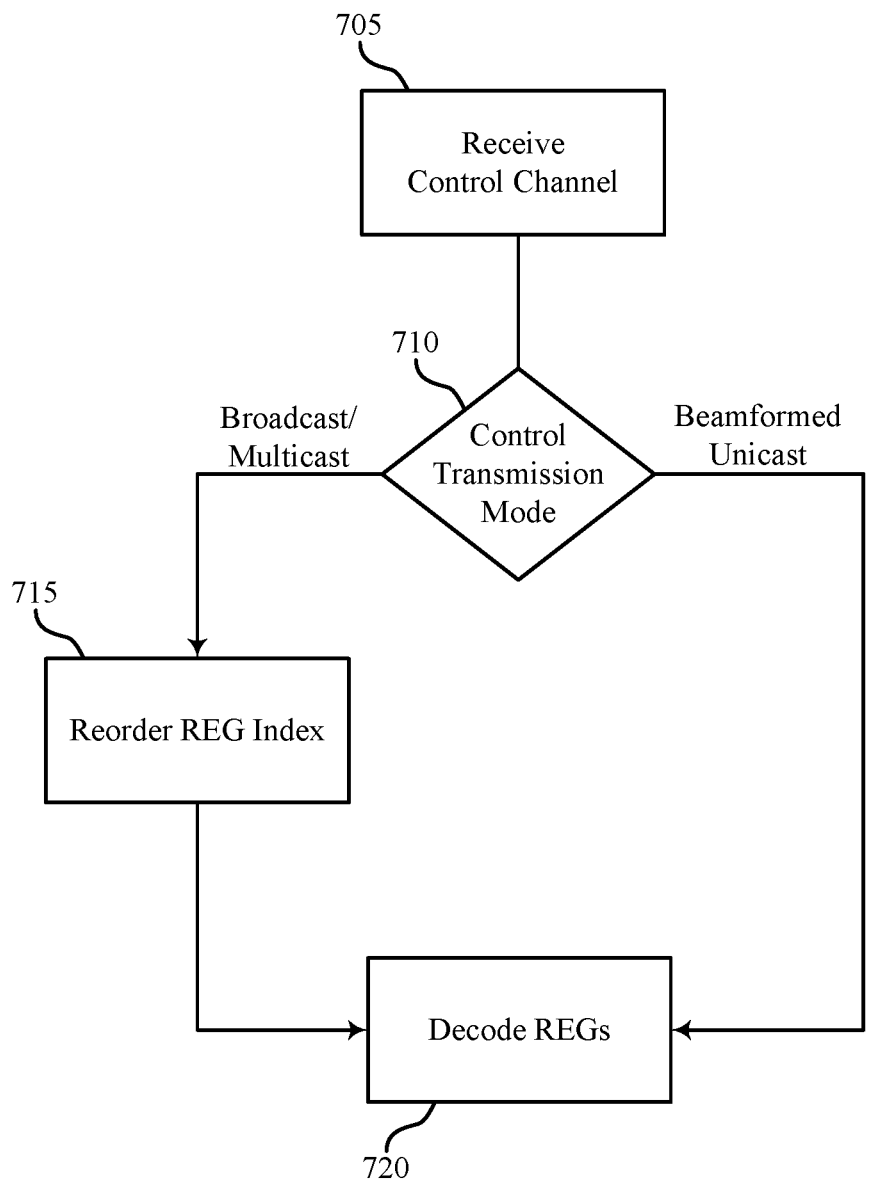
FIG. 7 illustrates an example of a method flow that supports techniques for improved control channels in accordance with aspects of the present disclosure.

FIG. 7 illustrates an example of a method flow 700 exemplifying aspects of UE 115 techniques for improved control channels that may be performed by a UE 115. At 705, a UE 115 may receive control channel signaling from a network device 105. At 710, if the transmission mode is beamformed unicast, UE 115 may decode REGs of the control channel. Alternatively, if the transmission mode is broadcast or multicast, UE 115 may reorder the REGs (e.g., by reversing the bit-reversed interleaving) at 715. In some cases, the determination of the transmission mode (e.g., 710) may occur prior to the reception of the control channel. Once the REGs are ordered by index or reordered, UE 115 may decode the REGs at 720.

Figure 8:
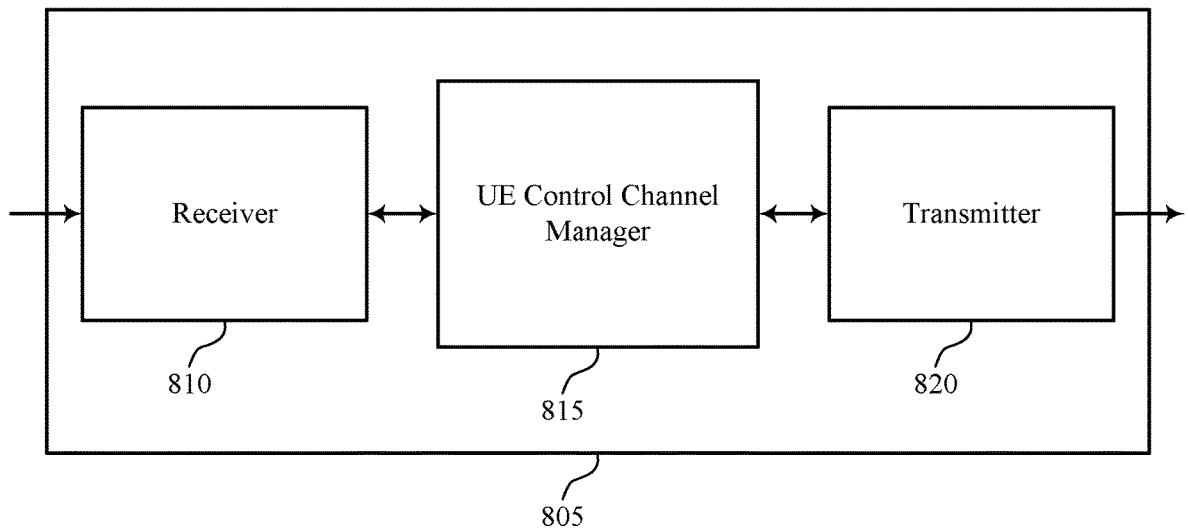
FIGS. 8 through 10 show block diagrams of a device that supports techniques for improved control channels in accordance with aspects of the present disclosure.

FIG. 8 shows a block diagram 800 of a device 805 that supports techniques for improved control channels in accordance with various aspects of the present disclosure. Device 805 may be an example of aspects of a UE 115 as described with reference to FIG. 1. Device 805 may include receiver 810, UE control channel manager 815, and transmitter 820. Device 805 may also include a processor. Each of these components may be in communication with one another (e.g., via one or more buses).

Receiver 810 may receive information such as packets, user data, or control information associated with various information channels (e.g., control channels, data channels, and information related to techniques for improved control channels, etc.). Information may be passed on to other components of the device. The receiver 810 may be an example of aspects of the transceiver 1135 described with reference to FIG. 11.

UE control channel manager 815 may be an example of aspects of the UE control channel manager 1115 described with reference to FIG. 11. UE control channel manager 815 may receive a control transmission from a base station, identify a control channel search space that is organized according to a nested structure, the control channel search space including a set of control channel candidates, where each of the set of control channel candidates is associated with one or more CCEs and an aggregation level, and search the received control transmission to identify a control channel for the UE using the set of control channel candidates. The UE control channel manager 815 may also receive a control channel transmission from a base station that includes a set of REGs organized into one or more CCEs, identify REG indices associated with the set of REGs, determine whether to reorder the REG indices based on a transmission mode associated with the control channel transmission, and decode the control channel transmission based on the set of REG indices to generate a control channel. The UE control channel manager 815 may also receive a control channel transmission from a base station, identify a set of DCI formats, each DCI format having a bit length that is an integer multiple of a predetermined base number of bits, and decode the control channel transmission based on the identified set of DCI formats to obtain DCI for the UE.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may include a single antenna, or a set of antennas.

Figure 9:
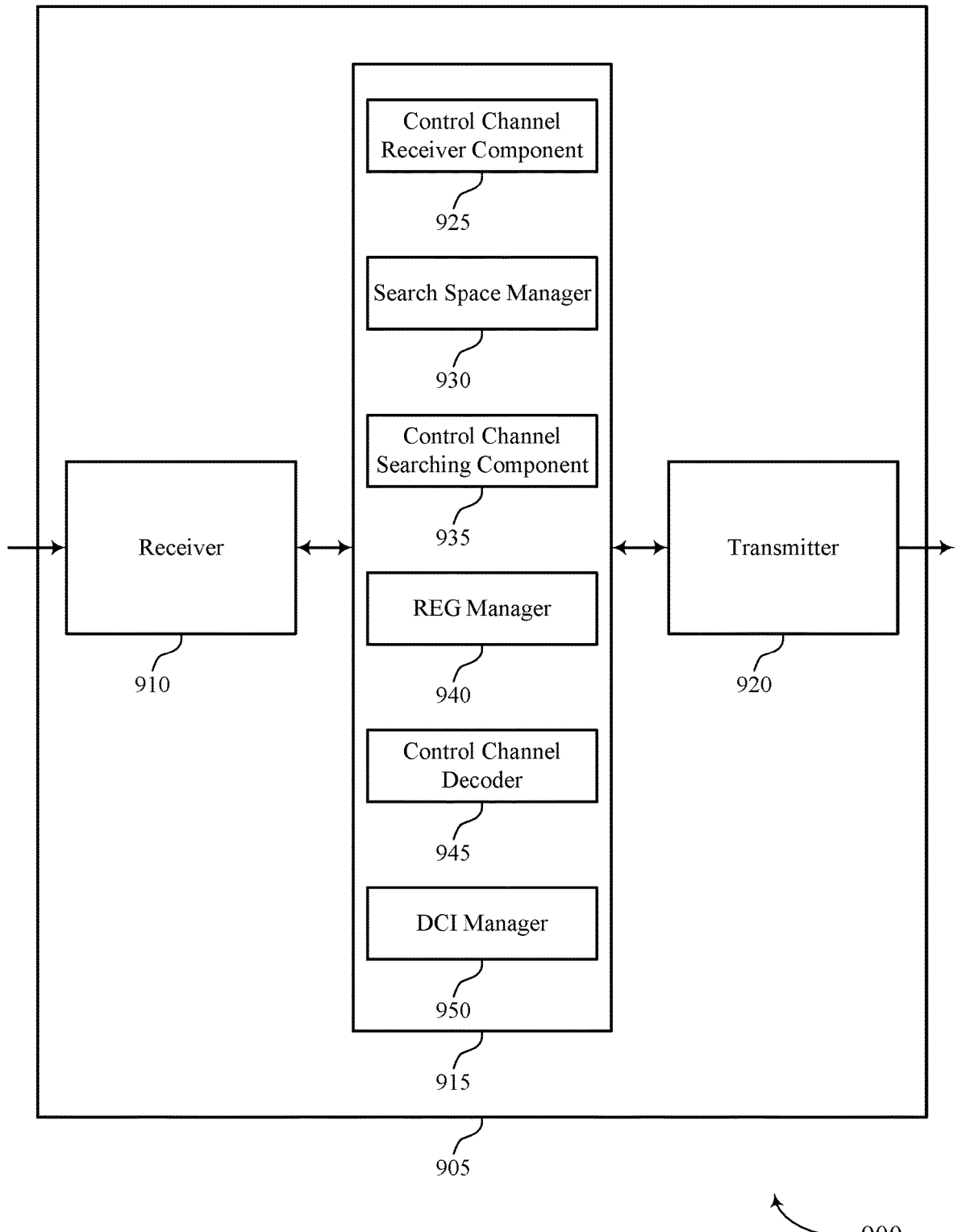

FIG. 9 shows a block diagram 900 of a device 905 that supports techniques for improved control channels in accordance with various aspects of the present disclosure. Device 905 may be an example of aspects of a device 805 or a UE 115 as described with reference to FIGS. 1 and 8. Device 905 may include receiver 910, UE control channel manager 915, and transmitter 920. Device 905 may also include a processor. Each of these components may be in communication with one another (e.g., via one or more buses).

Receiver 910 may receive information such as packets, user data, or control information associated with various information channels (e.g., control channels, data channels, and information related to techniques for improved control channels, etc.). Information may be passed on to other components of the device. The receiver 910 may be an example of aspects of the transceiver 1135 described with reference to FIG. 11.

UE control channel manager 915 may be an example of aspects of the UE control channel manager 1115 described with reference to FIG. 11. UE control channel manager 915 may also include control channel receiver component 925, search space manager 930, control channel searching component 935, REG manager 940, control channel decoder 945, and DCI manager 950.

Control channel receiver component 925 may receive a control transmission from a base station, receive a control channel transmission from a base station that includes a set of REGs organized into one or more CCEs, and receive a control channel transmission from a base station.

Search space manager 930 may identify a control channel search space that is organized according to a nested structure. The control channel search space may include a set of control channel candidates, where each of the set of control channel candidates is associated with one or more CCEs and an aggregation level. In some cases, a lower aggregation level search space includes one or more CCEs that are a subset of a higher aggregation level search space. In some cases, a higher aggregation level search space includes a sum of a set of lower aggregation level search spaces. In some cases, the set of lower aggregation level search spaces include one or more search spaces associated with a first aggregation level and one or more search spaces associated with a second aggregation level.

Control channel searching component 935 may search the received control transmission to identify a control channel for the UE, using the set of control channel candidates. REG manager 940 may identify REG indices associated with the set of REGs and determine whether to reorder the REG indices based on a transmission mode associated with the control channel transmission.

Control channel decoder 945 may decode the control channel transmission based on the set of REG indices to generate a control channel, decode the control channel transmission based on the identified set of DCI formats to obtain DCI for the UE, and decode a second portion of the control channel transmission based on the obtained indicator to obtain a second portion of the DCI. In some cases, decoding the control channel transmission includes: decoding a first portion of the control channel transmission based on the first DCI format portion to obtain an indicator of a bit length of the second DCI portion format and to obtain a first portion of the DCI.

DCI manager 950 may identify a set of DCI formats, each DCI format having a bit length that is an integer multiple of a predetermined base number of bits. In some cases, the predetermined base number of bits associated with DCI formats for uplink data is different that a second predetermined base number of bits associated with DCI formats for downlink data. In some cases, one or more DCI formats of the set of DCI formats include a first DCI format portion and a second DCI format portion.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may include a single antenna, or a set of antennas.

Figure 10:
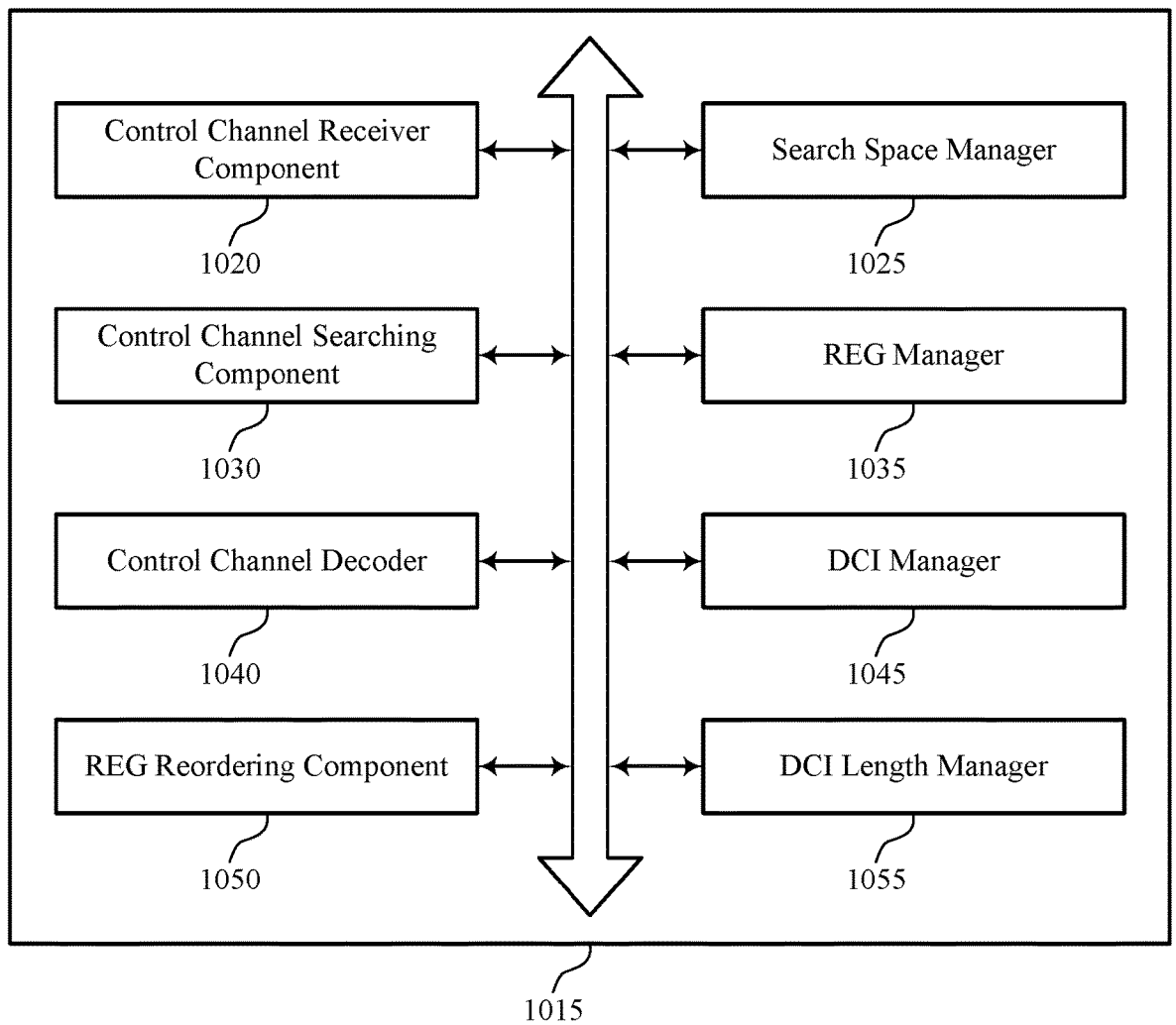

FIG. 10 shows a block diagram 1000 of a UE control channel manager 1015 that supports techniques for improved control channels in accordance with various aspects of the present disclosure. The UE control channel manager 1015 may be an example of aspects of a UE control channel manager 815, a UE control channel manager 915, or a UE control channel manager 1115 described with reference to FIGS. 8, 9, and 11. The UE control channel manager 1015 may include control channel receiver component 1020, search space manager 1025, control channel searching component 1030, REG manager 1035, control channel decoder 1040, DCI manager 1045, REG reordering component 1050, and DCI length manager 1055. Each of these modules may communicate, directly or indirectly, with one another (e.g., via one or more buses).

Control channel receiver component 1020 may receive a control channel transmission from a base station that includes a set of REGs organized into one or more CCEs.

Search space manager 1025 may identify a control channel search space that is organized according to a nested structure, the control channel search space including a set of control channel candidates, where each of the set of control channel candidates is associated with one or more CCEs and an aggregation level. In some cases, a lower aggregation level search space includes one or more CCEs that are a subset of a higher aggregation level search space. In some cases, a higher aggregation level search space includes a sum of a set of lower aggregation level search spaces. In some cases, the set of lower aggregation level search spaces include one or more search spaces associated with a first aggregation level and one or more search spaces associated with a second aggregation level.

Control channel searching component 1030 may search the received control transmission to identify a control channel for the UE using the set of control channel candidates. REG manager 1035 may identify REG indices associated with the set of REGs and determine whether to reorder the REG indices based on a transmission mode associated with the control channel transmission.

Control channel decoder 1040 may decode the control channel transmission based on the set of REG indices to generate a control channel, decode the control channel transmission based on the identified set of DCI formats to obtain DCI for the UE, and decode a second portion of the control channel transmission based on the obtained indicator to obtain a second portion of the DCI. In some cases, decoding the control channel transmission includes: decoding a first portion of the control channel transmission based on the first DCI format portion to obtain an indicator of a bit length of the second DCI portion format and to obtain a first portion of the DCI.

DCI manager 1045 may identify a set of DCI formats, each DCI format having a bit length that is an integer multiple of a predetermined base number of bits. In some cases, the predetermined base number of bits associated with DCI formats for uplink data is different that a second predetermined base number of bits associated with DCI formats for downlink data. In some cases, one or more DCI formats of the set of DCI formats include a first DCI format portion and a second DCI format portion.

REG reordering component 1050 may reorder the indices associated with the REGs based on a bit-reversal de-interleaving procedure. Reordering component 1050 may reorder the indices associate with the REGs, where the transmission mode associated with the received control channel transmission includes broadcasting or multicasting, and refrain from reordering the indices associated with the REGs, where the identified transmission mode for the received control channel transmission includes beamformed unicasting.

DCI length manager 1055 may receive, from the base station, an indicator of a bit length for the DCI for the UE in a radio resource control message or in a control region of a downlink subframe, identify that the UE is configured with a grant associated with a number of transmission time intervals (transmission time interval (TTI)s), where a bit length of the obtained DCI for the UE is based on the number of TTIs, and identify that the UE is configured with a grant associated with a number of component carriers (CCs), where a bit length of the obtained DCI for the UE is based on the number of CCs.

Figure 11:
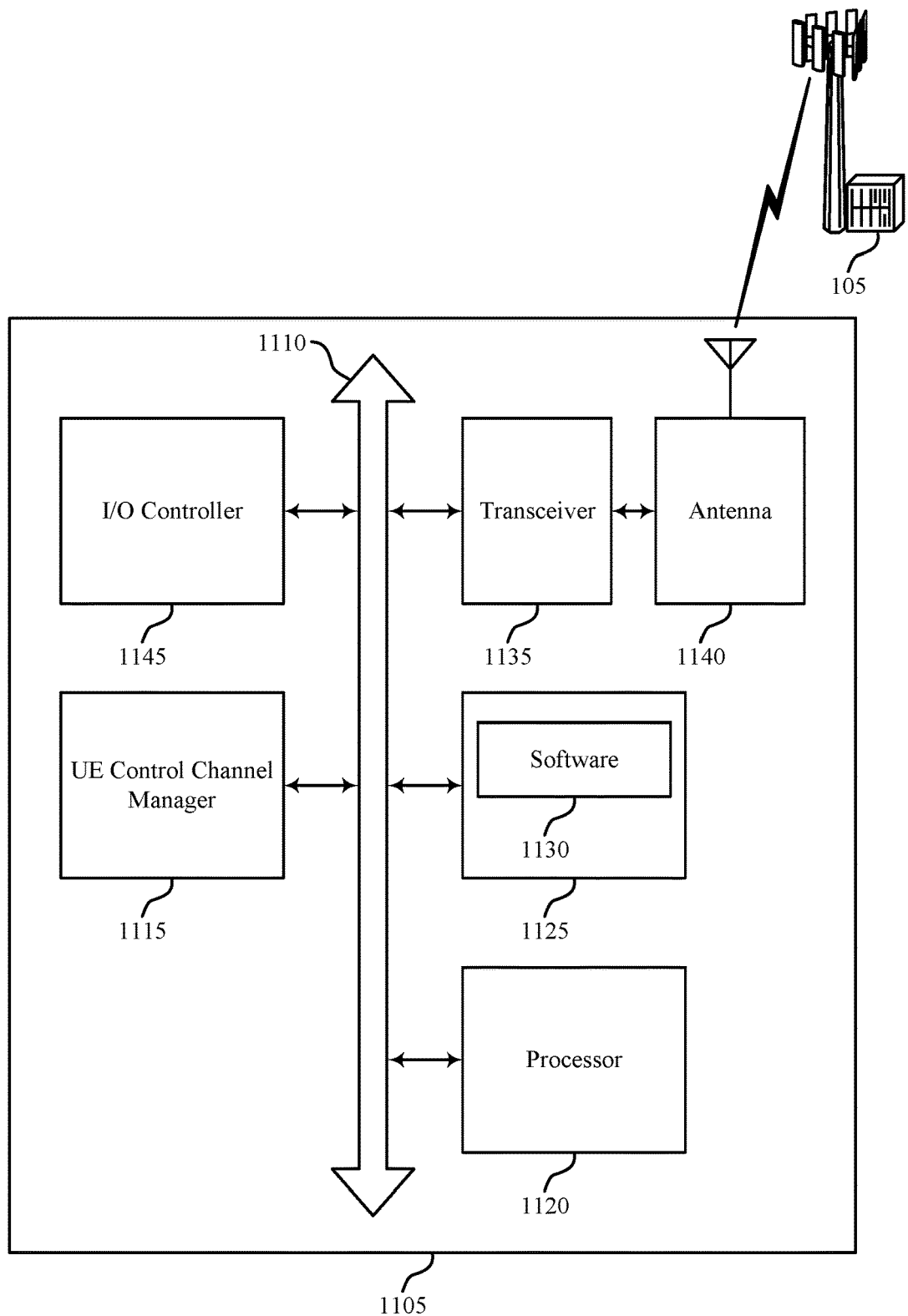
FIG. 11 illustrates a block diagram of a system, including a UE, that supports techniques for improved control channels in accordance with aspects of the present disclosure.

FIG. 11 shows a diagram of a system 1100 including a device 1105 that supports techniques for improved control channels in accordance with various aspects of the present disclosure. Device 1105 may be an example of or include the components of device 805, device 905, or a UE 115 as described above, e.g., with reference to FIGS. 1, 8 and 9. Device 1105 may include components for bi-directional voice and data communications including components for transmitting and receiving communications, including UE control channel manager 1115, processor 1120, memory 1125, software 1130, transceiver 1135, antenna 1140, and I/O controller 1145. These components may be in electronic communication via one or more busses (e.g., bus 1110). Device 1105 may communicate wirelessly with one or more network devices 105.

Processor 1120 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting techniques for improved control channels).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware and/or software operation such as the interaction with peripheral components or devices.

Software 1130 may include code to implement aspects of the present disclosure, including code to support techniques for improved control channels. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wires, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system.

Figure 12:
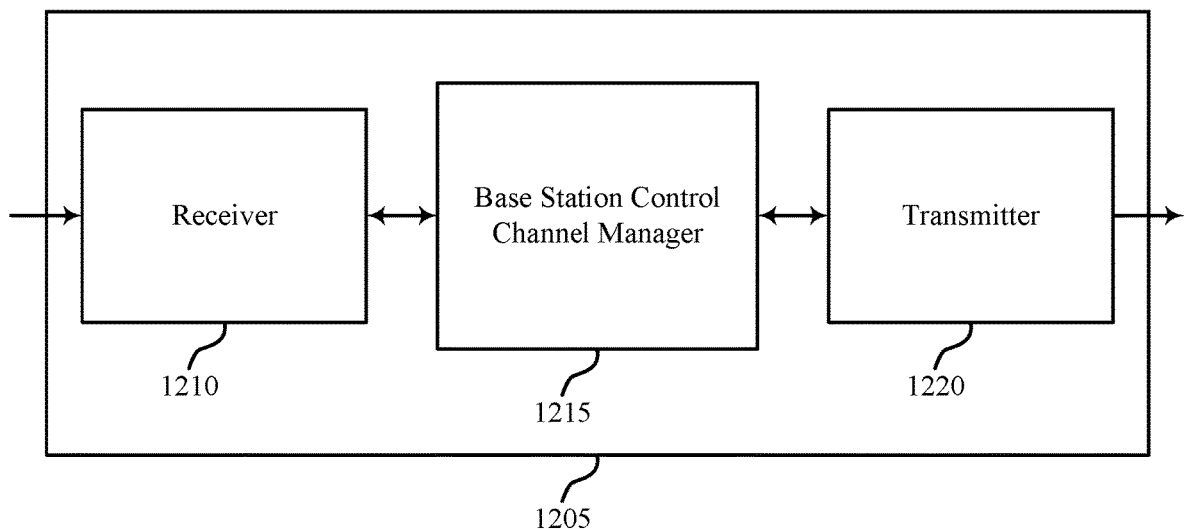
FIGS. 12 through 14 show block diagrams of a device that supports techniques for improved control channels in accordance with aspects of the present disclosure.

FIG. 12 shows a block diagram 1200 of a device 1205 that supports techniques for improved control channels in accordance with various aspects of the present disclosure. Device 1205 may be an example of aspects of a network device 105 as described with reference to FIG. 1. Device 1205 may include receiver 1210, base station control channel manager 1215, and transmitter 1220. Device 1205 may also include a processor. Each of these components may be in communication with one another (e.g., via one or more buses).

Receiver 1210 may receive information such as packets, user data, or control information associated with various information channels (e.g., control channels, data channels, and information related to techniques for improved control channels, etc.). Information may be passed on to other components of the device. The receiver 1210 may be an example of aspects of the transceiver 1535 described with reference to FIG. 15.

Base station control channel manager 1215 may be an example of aspects of the base station control channel manager 1515 described with reference to FIG. 15. Base station control channel manager 1215 may identify an aggregation level for a control channel for a UE, identify a nested structure for a control channel search space, the control channel search space including a set of control channel candidates, where each of the set of control channel candidates is associated with one or more CCEs and an aggregation level, map the control channel to one or more CCEs of the control channel search space based on the aggregation level, and transmit the control channel to the UE. The base station control channel manager 1215 may also identify a transmission mode for a control channel to be transmitted to one or more UEs, identify REG indices associated with a set of REGs for the control channel, determine whether to reorder the REG indices based on the identified transmission mode, and transmit, using the identified transmission mode, the control channel including the REGs organized in the control channel based on the REG indices. The base station control channel manager 1215 may also select, from among a set of DCI formats, a DCI format for a control channel transmission to be sent to a UE, each DCI format of the set of DCI formats having a bit length that is an integer multiple of a predetermined base value, encode DCI for the UE, the DCI formatted according to the selected DCI format, and transmit the encoded DCI to the UE in a control channel.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may include a single antenna, or a set of antennas.

Figure 13:
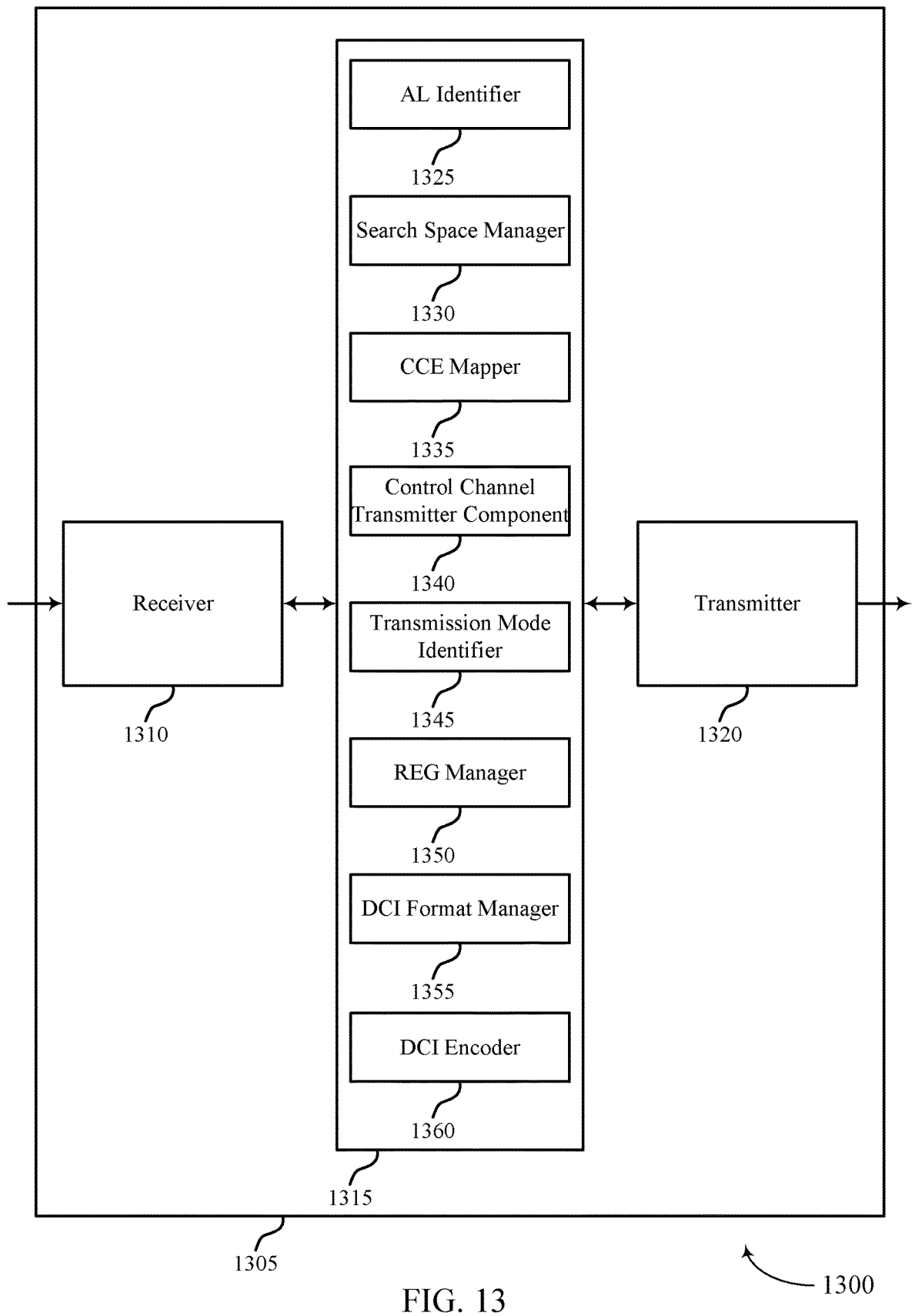

FIG. 13 shows a block diagram 1300 of a device 1305 that supports techniques for improved control channels in accordance with various aspects of the present disclosure. Device 1305 may be an example of aspects of a device 1205 or a network device 105 as described with reference to FIGS. 1 and 12. Device 1305 may include receiver 1310, base station control channel manager 1315, and transmitter 1320. Device 1305 may also include a processor. Each of these components may be in communication with one another (e.g., via one or more buses).

Receiver 1310 may receive information such as packets, user data, or control information associated with various information channels (e.g., control channels, data channels, and information related to techniques for improved control channels, etc.). Information may be passed on to other components of the device. The receiver 1310 may be an example of aspects of the transceiver 1535 described with reference to FIG. 15.

Base station control channel manager 1315 may be an example of aspects of the base station control channel manager 1515 described with reference to FIG. 15. Base station control channel manager 1315 may also include AL identifier 1325, search space manager 1330, CCE mapper 1335, control channel transmitter component 1340, transmission mode identifier 1345, REG manager 1350, DCI format manager 1355, and DCI encoder 1360. AL identifier 1325 may identify an aggregation level for a UE control channel.

Search space manager 1330 may identify a nested structure for a control channel search space, the control channel search space including a set of control channel candidates, where each of the set of control channel candidates is associated with one or more CCEs and an aggregation level. In some cases, a lower aggregation level search space includes one or more CCEs that are a subset of a higher aggregation level search space. In some cases, a higher aggregation level search space includes a sum of a set of lower aggregation level search spaces. In some cases, the set of lower aggregation level search spaces include one or more search spaces associated with a first aggregation level and one or more search spaces associated with a second aggregation level.

CCE mapper 1335 may map the control channel to one or more CCEs of the control channel search space based on the aggregation level. Control channel transmitter component 1340 may transmit the control channel to the UE, transmit, using the identified transmission mode, the control channel including the REGs organized in the control channel based on the REG indices, and transmit the encoded DCI to the UE in a control channel.

Transmission mode identifier 1345 may identify a transmission mode for a control channel to be transmitted to one or more UEs. REG manager 1350 may identify REG indices associated with a set of REGs for the control channel and determine whether to reorder the REG indices based on the identified transmission mode. DCI format manager 1355 may select, from among a set of DCI formats, a DCI format for a control channel transmission to be sent to a UE, each DCI format of the set of DCI formats having a bit length that is an integer multiple of a predetermined base value.

DCI encoder 1360 may encode DCI for the UE, the DCI formatted according to the selected DCI format. In some cases, encoding the DCI for the UE further includes: padding the DCI with one or more pad bits to fill at least a portion of the DCI format. In some cases, encoding the DCI for the UE further includes: inserting one or more cyclic redundancy check bits to fill at least a portion of the DCI format. In some cases, encoding the DCI for the UE further includes: inserting a copy of at least a portion of the DCI to fill at least a portion of the DCI format.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may include a single antenna, or set of antennas.

Figure 14:
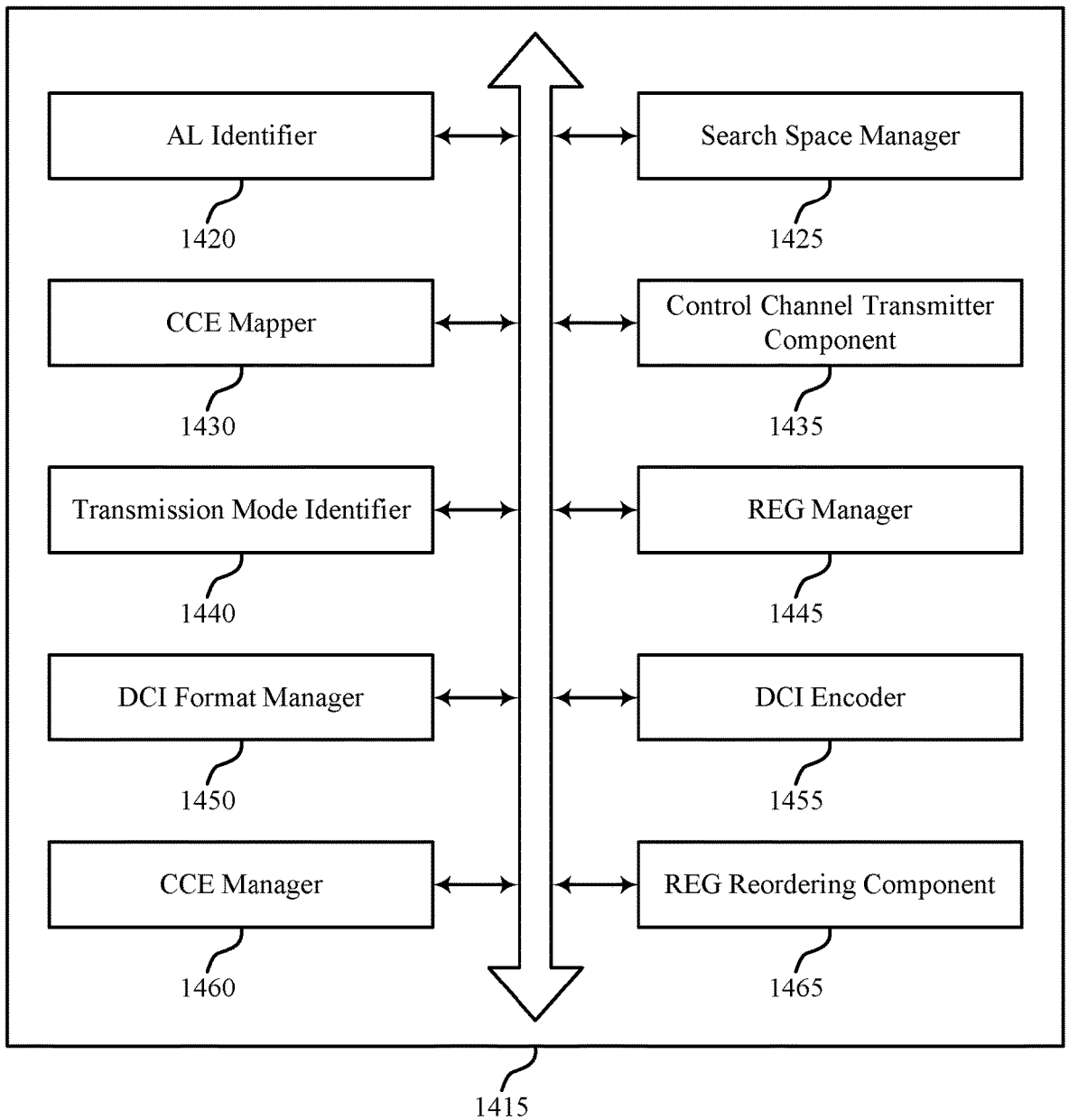

FIG. 14 shows a block diagram 1400 of a base station control channel manager 1415 that supports techniques for improved control channels in accordance with various aspects of the present disclosure. The base station control channel manager 1415 may be an example of aspects of a base station control channel manager 1515 described with reference to FIGS. 12, 13, and 15. The base station control channel manager 1415 may include AL identifier 1420, search space manager 1425, CCE mapper 1430, control channel transmitter component 1435, transmission mode identifier 1440, REG manager 1445, DCI format manager 1450, DCI encoder 1455, CCE manager 1460, and REG reordering component 1465. Each of these modules may communicate, directly or indirectly, with one another (e.g., via one or more buses). AL identifier 1420 may identify an aggregation level for a control channel for a UE.

Search space manager 1425 may identify a nested structure for a control channel search space, the control channel search space including a set of control channel candidates, where each of the set of control channel candidates is associated with one or more CCEs and an aggregation level. In some cases, a lower aggregation level search space includes one or more CCEs that are a subset of a higher aggregation level search space. In some cases, a higher aggregation level search space includes a sum of a set of lower aggregation level search spaces. In some cases, the set of lower aggregation level search spaces include one or more search spaces associated with a first aggregation level and one or more search spaces associated with a second aggregation level.

CCE mapper 1430 may map the control channel to one or more CCEs of the control channel search space based on the aggregation level. Control channel transmitter component 1435 may transmit the control channel to the UE, transmit, using the identified transmission mode, the control channel including the REGs organized in the control channel based on the REG indices, and transmit the encoded DCI to the UE in a control channel.

Transmission mode identifier 1440 may identify a transmission mode for a control channel to be transmitted to one or more UEs. REG manager 1445 may identify REG indices associated with a set of REGs for the control channel and determine whether to reorder the REG indices based on the identified transmission mode. DCI format manager 1450 may select, from among a set of DCI formats, a DCI format for a control channel transmission to be sent to a UE, each DCI format of the set of DCI formats having a bit length that is a integer multiple of a predetermined base value.

DCI encoder 1455 may encode DCI for the UE, the DCI formatted according to the selected DCI format. In some cases, encoding the DCI for the UE further includes: padding the DCI with one or more pad bits to fill at least a portion of the DCI format. In some cases, encoding the DCI for the UE further includes: inserting one or more cyclic redundancy check bits to fill at least a portion of the DCI format. In some cases, encoding the DCI for the UE further includes: inserting a copy of at least a portion of the DCI to fill at least a portion of the DCI format.

CCE manager 1460 may map one or more sets of REGs selected from the set of REGs to one or more CCEs of the transmitted control channel based on the indices.

REG reordering component 1465 may reorder the indices associated with the REGs based on a bit-reversal interleaving procedure. REG reordering component 1465 may reorder the indices associated with the REGs, where the identified transmission mode for the control channel includes broadcasting or multicasting, and refrain from reordering the indices associated with the REGs, where the identified transmission mode for the control channel includes beamformed unicasting.

Figure 15:
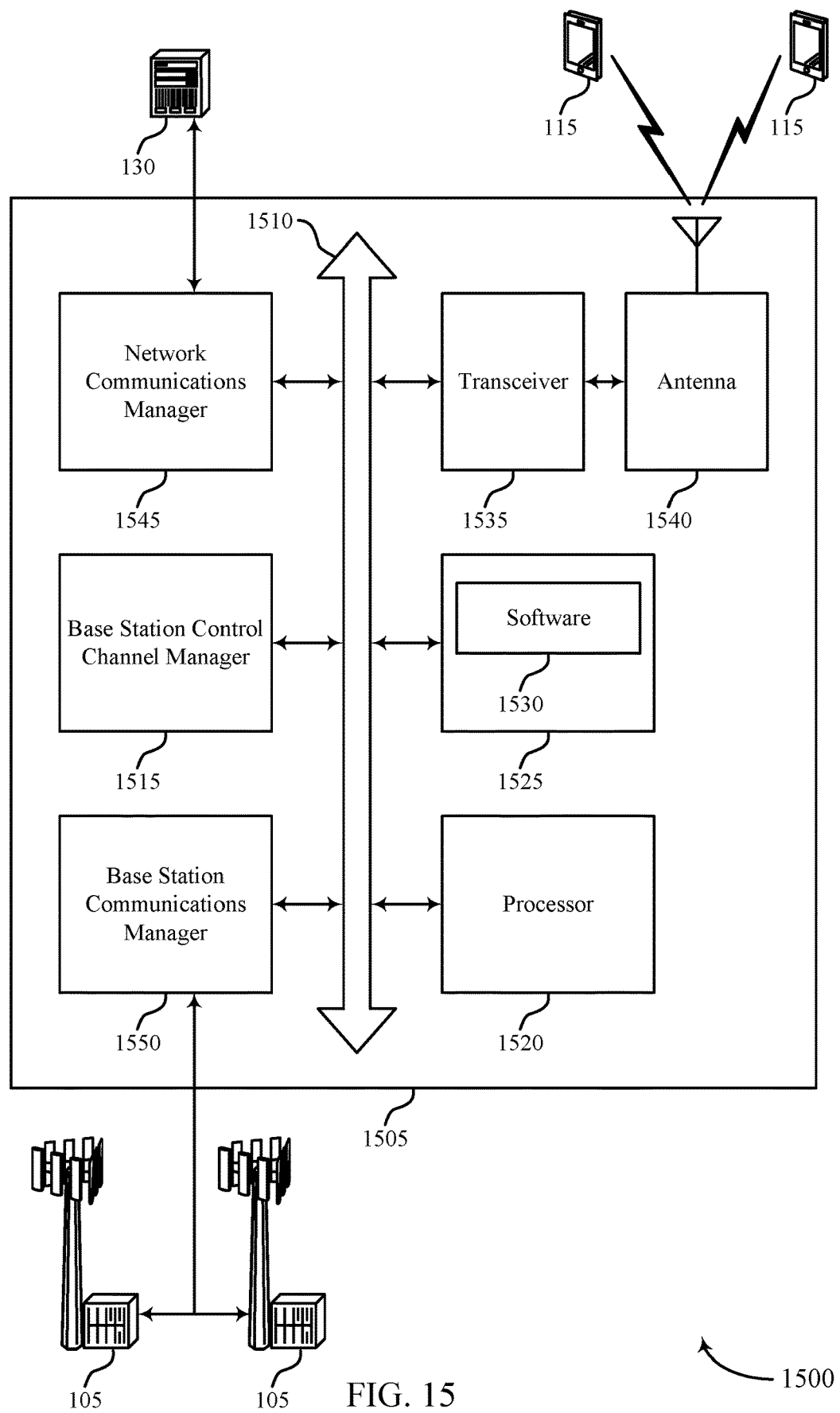
FIG. 15 illustrates a block diagram of a system, including a base station, that supports techniques for improved control channels in accordance with aspects of the present disclosure.

FIG. 15 shows a diagram of a system 1500 including a device 1505 that supports techniques for improved control channels in accordance with various aspects of the present disclosure. Device 1505 may be an example of or include the components of network device 105 as described above, e.g., with reference to FIG. 1. Device 1505 may include components for bi-directional voice and data communications including components for transmitting and receiving communications, including base station control channel manager 1515, processor 1520, memory 1525, software 1530, transceiver 1535, antenna 1540, network communications manager 1545, and base station communications manager 1550. These components may be in electronic communication via one or more busses (e.g., bus 1510). Device 1505 may communicate wirelessly with one or more UEs 115.

Processor 1520 may include an intelligent hardware device, (e.g., a general-purpose processor, a DSP, a CPU, a microcontroller, an ASIC, a FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting techniques for improved control channels).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware and/or software operation such as the interaction with peripheral components or devices.

Software 1530 may include code to implement aspects of the present disclosure, including code to support techniques for improved control channels. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wires, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Base station communications manager 1550 may manage communications with other network device 105, and may include a controller or scheduler for controlling communications with UEs 115 in cooperation with other network devices 105. For example, the base station communications manager 1550 may coordinate scheduling for transmissions to UEs 115 for various interference mitigation techniques such as beamforming or joint transmission. In some examples, base station communications manager 1550 may provide an X2 interface within a Long Term Evolution (LTE)/LTE-A wireless communication network technology to provide communication between network devices 105.

Figure 16:
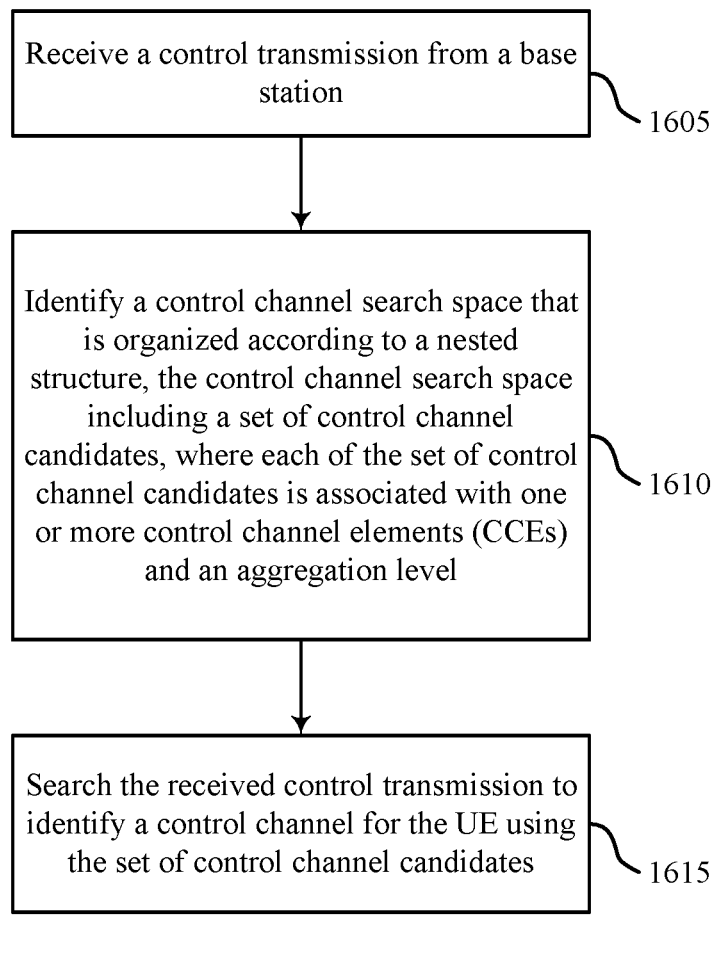
FIGS. 16 through 21 illustrate methods for techniques for improved control channels in accordance with aspects of the present disclosure.

FIG. 16 shows a flowchart illustrating a method 1600 for techniques for improved control channels in accordance with various aspects of the present disclosure. The operations of method 1600 may be implemented by a UE 115 or its components as described herein. For example, the operations of method 1600 may be performed by a UE control channel manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive a control transmission from a base station. The operations of block 1605 may be performed according to the methods described with reference to FIGS. 1 through 7. In some examples, aspects of the operations of block 1605 may be performed by a control channel receiver component as described with reference to FIGS. 8 through 11.

At block 1610 the UE 115 may identify a control channel search space that is organized according to a nested structure, the control channel search space including a plurality of control channel candidates, wherein each of the plurality of control channel candidates is associated with one or more CCEs and an aggregation level. The operations of block 1610 may be performed according to the methods described with reference to FIGS. 1 through 7. In some examples, aspects of the operations of block 1610 may be performed by a search space manager as described with reference to FIGS. 8 through 11.

At block 1615 the UE 115 may search the received control transmission to identify a control channel for the UE using the plurality of control channel candidates. The operations of block 1615 may be performed according to the methods described with reference to FIGS. 1 through 7. In some examples, aspects of the operations of block 1615 may be performed by a control channel searching component as described with reference to FIGS. 8 through 11.

Figure 17:
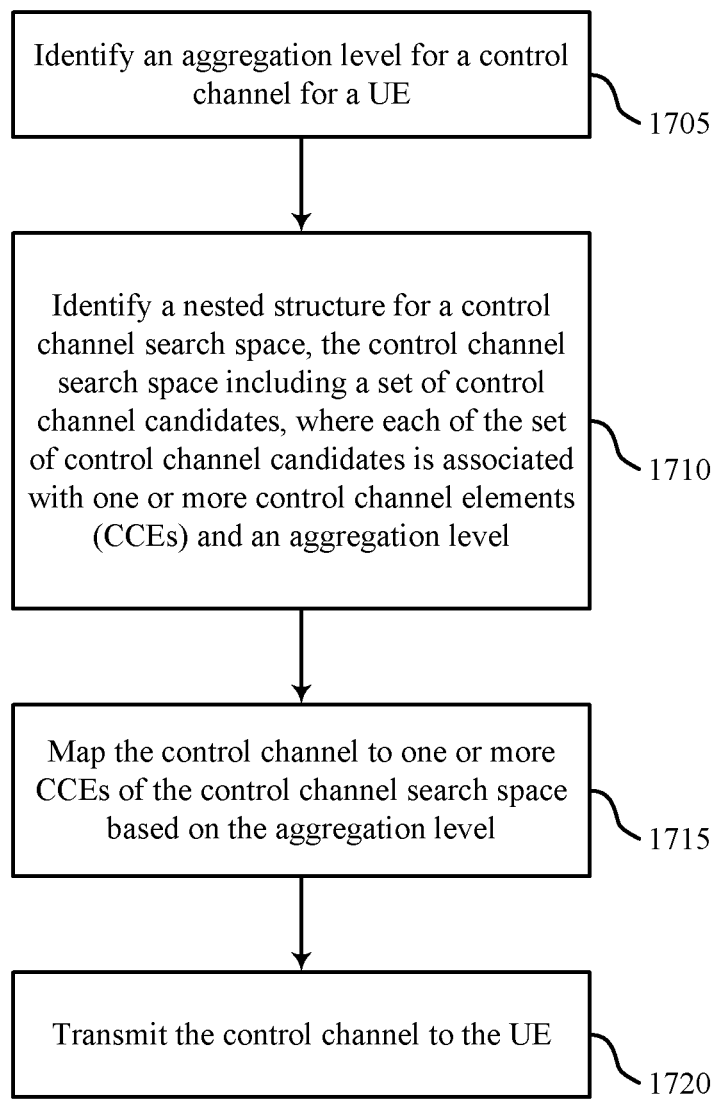

FIG. 17 shows a flowchart illustrating a method 1700 for techniques for improved control channels in accordance with various aspects of the present disclosure. The operations of method 1700 may be implemented by a network device 105 or its components as described herein. For example, the operations of method 1700 may be performed by a base station control channel manager as described with reference to FIGS. 12 through 15. In some examples, a network device 105 may execute a set of codes to control the functional elements of the device to perform the functions described below. Additionally or alternatively, the network device 105 may perform aspects of the functions described below using special-purpose hardware.

At block 1705 the network device 105 may identify an aggregation level for a control channel for a UE. The operations of block 1705 may be performed according to the methods described with reference to FIGS. 1 through 7. In some examples, aspects of the operations of block 1705 may be performed by a AL identifier as described with reference to FIGS. 12 through 15.

At block 1710 the network device 105 may identify a nested structure for a control channel search space, the control channel search space including a plurality of control channel candidates, wherein each of the plurality of control channel candidates is associated with one or more CCEs and an aggregation level. The operations of block 1710 may be performed according to the methods described with reference to FIGS. 1 through 7. In some examples, aspects of the operations of block 1710 may be performed by a search space manager as described with reference to FIGS. 12 through 15.

At block 1715 the network device 105 may map the control channel to one or more CCEs of the control channel search space based at least in part on the aggregation level. The operations of block 1715 may be performed according to the methods described with reference to FIGS. 1 through 7. In some examples, aspects of the operations of block 1715 may be performed by a CCE mapper as described with reference to FIGS. 12 through 15.

At block 1720 the network device 105 may transmit the control channel to the UE. The operations of block 1720 may be performed according to the methods described with reference to FIGS. 1 through 7. In some examples, aspects of the operations of block 1720 may be performed by a control channel transmitter component as described with reference to FIGS. 12 through 15.

Figure 18:
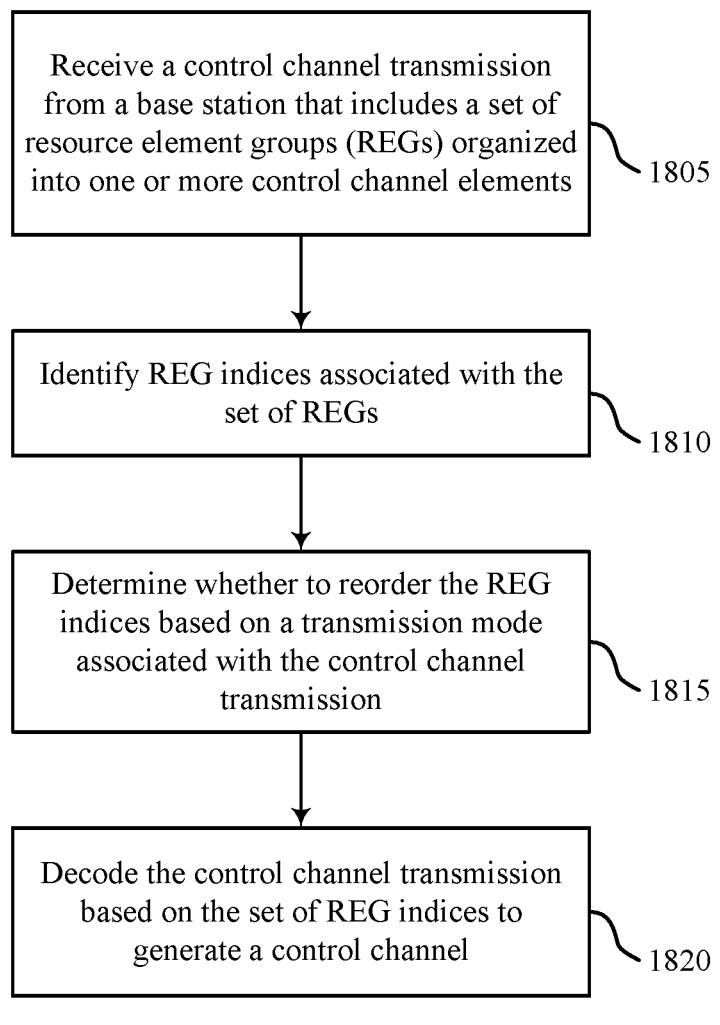

FIG. 18 shows a flowchart illustrating a method 1800 for techniques for improved control channels in accordance with various aspects of the present disclosure. The operations of method 1800 may be implemented by a UE 115 or its components as described herein. For example, the operations of method 1800 may be performed by a UE control channel manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may receive a control channel transmission from a base station that includes a plurality of REGs organized into one or more CCEs. The operations of block 1805 may be performed according to the methods described with reference to FIGS. 1 through 7. In some examples, aspects of the operations of block 1805 may be performed by a control channel receiver component as described with reference to FIGS. 8 through 11.

At block 1810 the UE 115 may identify REG indices associated with the plurality of REGs. The operations of block 1810 may be performed according to the methods described with reference to FIGS. 1 through 7. In some examples, aspects of the operations of block 1810 may be performed by a REG manager as described with reference to FIGS. 8 through 11.

At block 1815 the UE 115 may determine whether to reorder the REG indices based at least in part on a transmission mode associated with the control channel transmission. The operations of block 1815 may be performed according to the methods described with reference to FIGS. 1 through 7. In some examples, aspects of the operations of block 1815 may be performed by a REG manager as described with reference to FIGS. 8 through 11.

At block 1820 the UE 115 may decode the control channel transmission based at least in part on the plurality of REG indices to generate a control channel. The operations of block 1820 may be performed according to the methods described with reference to FIGS. 1 through 7. In some examples, aspects of the operations of block 1820 may be performed by a control channel decoder as described with reference to FIGS. 8 through 11.

Figure 19:
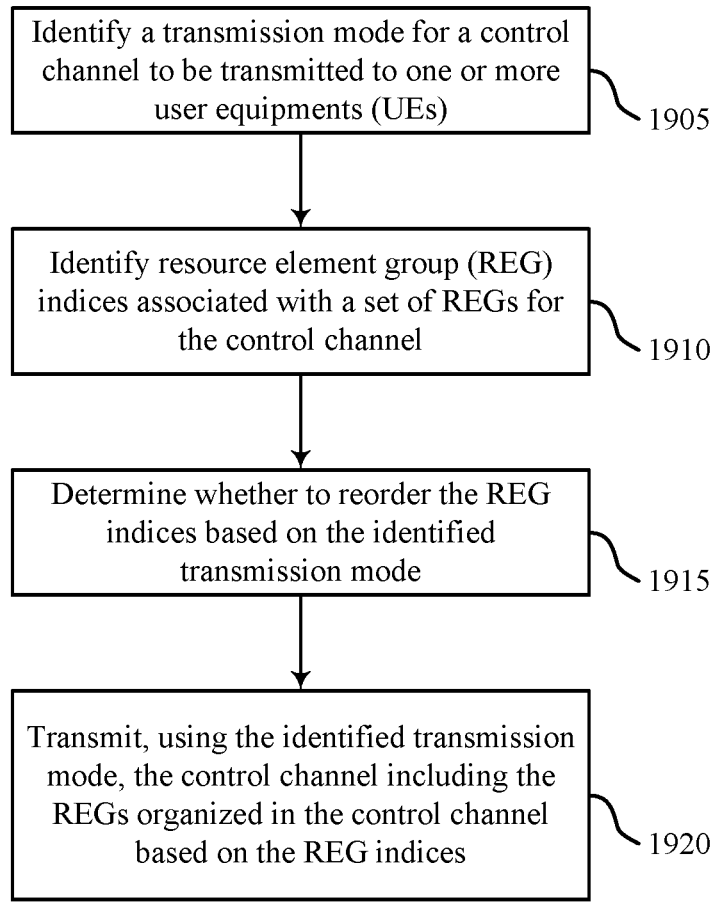

FIG. 19 shows a flowchart illustrating a method 1900 for techniques for improved control channels in accordance with various aspects of the present disclosure. The operations of method 1900 may be implemented by a network device 105 or its components as described herein. For example, the operations of method 1900 may be performed by a base station control channel manager as described with reference to FIGS. 12 through 15. In some examples, a network device 105 may execute a set of codes to control the functional elements of the device to perform the functions described below. Additionally or alternatively, the network device 105 may perform aspects of the functions described below using special-purpose hardware.

At block 1905 the network device 105 may identify a transmission mode for a control channel to be transmitted to one or more UEs. The operations of block 1905 may be performed according to the methods described with reference to FIGS. 1 through 7. In some examples, aspects of the operations of block 1905 may be performed by a transmission mode identifier as described with reference to FIGS. 12 through 15.

At block 1910 the network device 105 may identify REG indices associated with a plurality of REGs for the control channel. The operations of block 1910 may be performed according to the methods described with reference to FIGS. 1 through 7. In some examples, aspects of the operations of block 1910 may be performed by a REG manager as described with reference to FIGS. 12 through 15.

At block 1915 the network device 105 may determine whether to reorder the REG indices based at least in part on the identified transmission mode. The operations of block 1915 may be performed according to the methods described with reference to FIGS. 1 through 7. In some examples, aspects of the operations of block 1915 may be performed by a REG manager as described with reference to FIGS. 12 through 15.

At block 1920 the network device 105 may transmit, using the identified transmission mode, the control channel including the REGs organized in the control channel based at least in part on the REG indices. The operations of block 1920 may be performed according to the methods described with reference to FIGS. 1 through 7. In some examples, aspects of the operations of block 1920 may be performed by a control channel transmitter component as described with reference to FIGS. 12 through 15.

Figure 20:
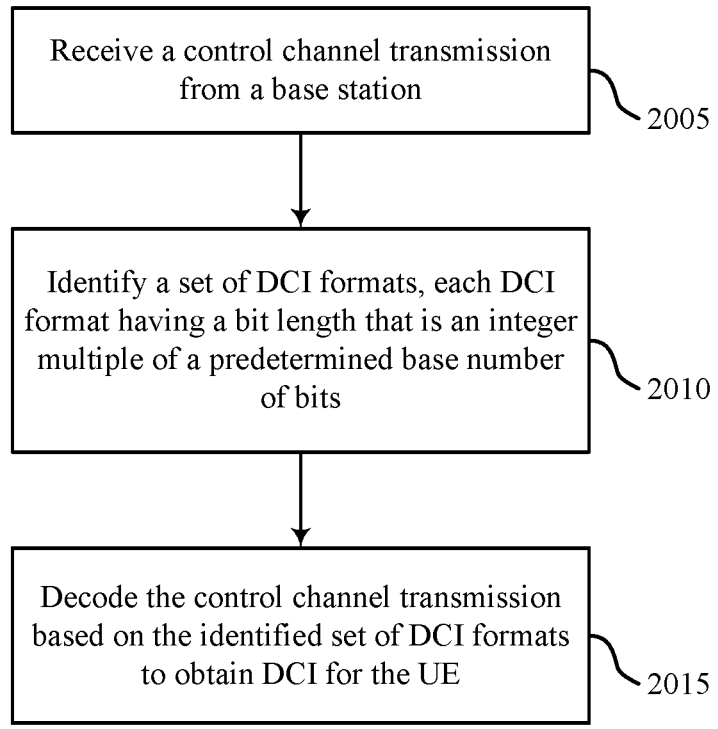

FIG. 20 shows a flowchart illustrating a method 2000 for techniques for improved control channels in accordance with various aspects of the present disclosure. The operations of method 2000 may be implemented by a UE 115 or its components as described herein. For example, the operations of method 2000 may be performed by a UE control channel manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 2005 the UE 115 may receive a control channel transmission from a base station. The operations of block 2005 may be performed according to the methods described with reference to FIGS. 1 through 7. In some examples, aspects of the operations of block 2005 may be performed by a control channel receiver component as described with reference to FIGS. 8 through 11.

At block 2010 the UE 115 may identify a plurality of DCI formats, each DCI format having a bit length that is an integer multiple of a predetermined base number of bits. The operations of block 2010 may be performed according to the methods described with reference to FIGS. 1 through 7. In some examples, aspects of the operations of block 2010 may be performed by a DCI manager as described with reference to FIGS. 8 through 11.

At block 2015 the UE 115 may decode the control channel transmission based at least in part on the identified plurality of DCI formats to obtain DCI for the UE. The operations of block 2015 may be performed according to the methods described with reference to FIGS. 1 through 7. In some examples, aspects of the operations of block 2015 may be performed by a control channel decoder as described with reference to FIGS. 8 through 11.

Figure 21:
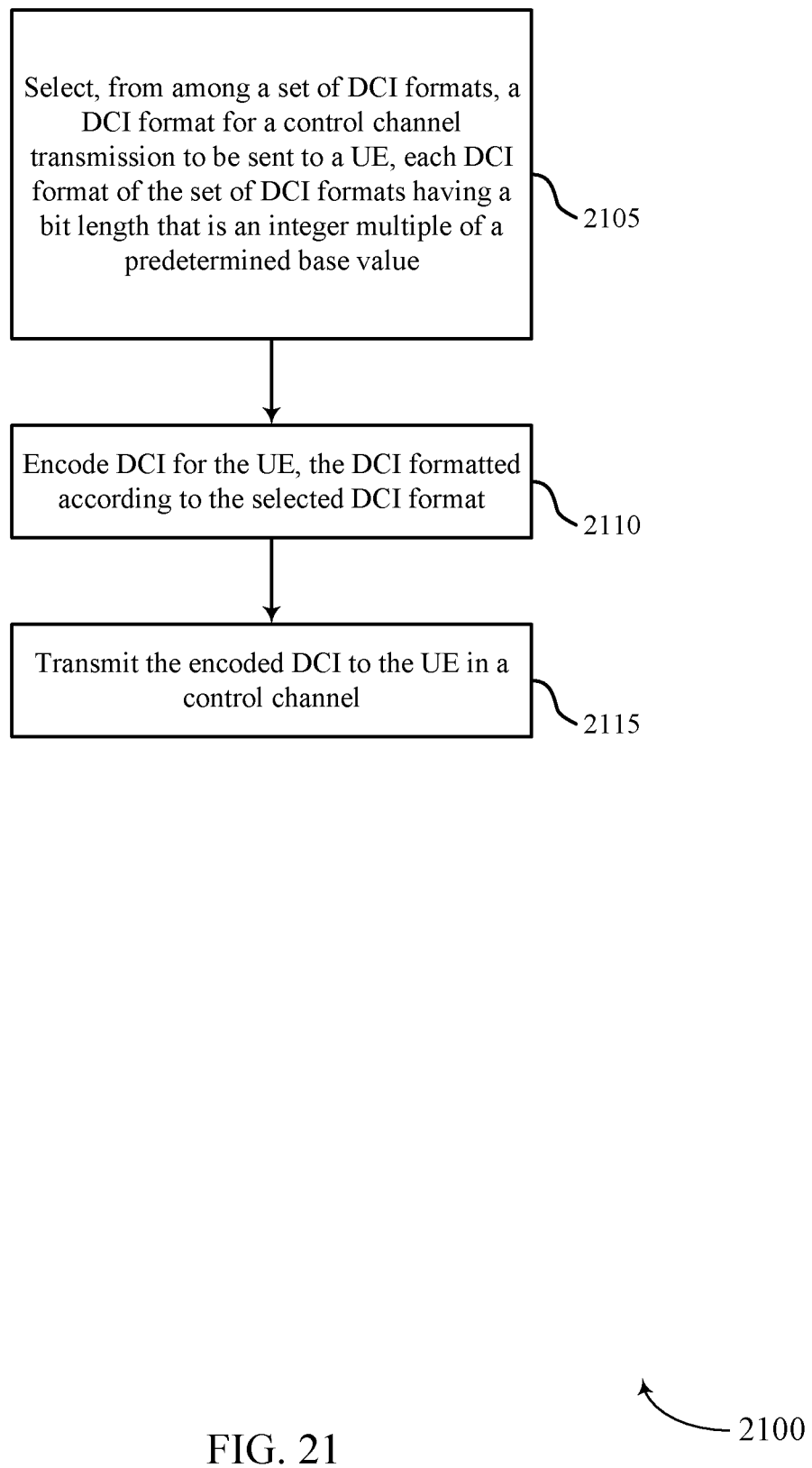

FIG. 21 shows a flowchart illustrating a method 2100 for techniques for improved control channels in accordance with various aspects of the present disclosure. The operations of method 2100 may be implemented by a network device 105 or its components as described herein. For example, the operations of method 2100 may be performed by a base station control channel manager as described with reference to FIGS. 12 through 15. In some examples, a network device 105 may execute a set of codes to control the functional elements of the device to perform the functions described below. Additionally or alternatively, the network device 105 may perform aspects of the functions described below using special-purpose hardware.

At block 2105 the network device 105 may select, from among a plurality of DCI formats, a DCI format for a control channel transmission to be sent to a UE, each DCI format of the plurality of DCI formats having a bit length that is an integer multiple of a predetermined base value. The operations of block 2105 may be performed according to the methods described with reference to FIGS. 1 through 7. In some examples, aspects of the operations of block 2105 may be performed by a DCI format manager as described with reference to FIGS. 12 through 15.

At block 2110 the network device 105 may encode DCI for the UE, the DCI formatted according to the selected DCI format. The operations of block 2110 may be performed according to the methods described with reference to FIGS. 1 through 7. In some examples, aspects of the operations of block 2110 may be performed by a DCI encoder as described with reference to FIGS. 12 through 15.

At block 2115 the network device 105 may transmit the encoded DCI to the UE in a control channel. The operations of block 2115 may be performed according to the methods described with reference to FIGS. 1 through 7. In some examples, aspects of the operations of block 2115 may be performed by a control channel transmitter component as described with reference to FIGS. 12 through 15.

It should be noted that the methods above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of a LTE system may be described for purposes of example, and LTE terminology may be used in much of the description, the techniques described herein are applicable beyond LTE applications.

In LTE/LTE-A networks, including such networks described herein, the term evolved node B (eNB) may be used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell may cover a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a base station, a control-resource set that includes a plurality of resource element groups (REGs) organized into one or more control channel elements based at least in part on a configuration of the control-resource set;
   identifying a REG index for each REG of the plurality of REGs;

determining a transmission mode type of the control-resource set based at least in part on whether the configuration of the control-resource set is associated with broadcast transmission, wherein the transmission mode type is determined from a set of transmission mode types comprising broadcast transmission and unicast transmission;

reordering, before decoding the control-resource set and based at least in part on determining the transmission mode type of the control-resource set, the identified REG indices according to a bit-reversal de-interleaving procedure corresponding to the transmission mode type of the configuration of the control-resource set after determining the transmission mode type of the control-resource set, wherein the bit-reversal de-interleaving procedure comprises switching each bit of an REG binary index from a first value to a second value or from the second value to the first value; and decoding the control-resource set based at least in part on reordering the identified REG indices according to the transmission mode type.

2. The method of claim 1, wherein the reordering comprises:
reordering the identified REG indices for each of the plurality of REGs based at least in part on a bit-reversal de-interleaving procedure corresponding to the broadcast transmission mode type.

3. The method of claim 1, wherein the reordering comprises:
reordering the identified REG indices for each of the plurality of REGs.

4. The method of claim 3, further comprising:
performing wide-band channel estimation independent of the reordering.

5. The method of claim 1, further comprising:
refraining from reordering the identified REG indices for each of the plurality of REGs after determining the transmission mode type of the control-resource set.

6. The method of claim 5, further comprising:
refraining from performing wide-band channel estimation.

7. The method of claim 1, further comprising:
generating a control channel based at least in part on decoding the control-resource set.

8. The method of claim 1, further comprising:
determining that the control-resource set will be transmitted via broadcast, wherein reordering the identified REG indices comprises:
reordering the identified REG indices after determining that the transmission mode type of the control-resource set is broadcast transmission.

9. An apparatus for wireless communication, comprising:
a processor,
memory in electronic communication with the processor; and
instructions stored in the memory and executable by the processor to cause the apparatus to:
receive, from a base station, a control-resource set that includes a plurality of resource element groups (REGs) organized into one or more control channel elements based at least in part on a configuration of the control-resource set;
identify a REG index for each REG of the plurality of REGs;
determine a transmission mode type of the control-resource set based at least in part on whether the configuration of the control-resource set is associated with broadcast transmission, wherein the transmission mode type is determined from a set of transmission mode types comprising broadcast transmission and unicast transmission;

reorder, before decoding the control-resource set and based at least in part on determining the transmission mode type of the control-resource set, the identified REG indices according to a bit-reversal de-interleaving procedure corresponding to the transmission mode type of the configuration of the control-resource set after determining the transmission mode type of the control-resource set, wherein the bit-reversal de-interleaving procedure comprises switching each bit of an REG binary index from a first value to a second value or from the second value to the first value; and decode the control-resource set based at least in part on reordering the identified REG indices according to the transmission mode type.

10. The apparatus of claim 9, wherein the instructions to reorder the identified REG indices further include instructions that are executable by the processor to cause the apparatus to:
reorder the identified REG indices for each of the plurality of REGs based at least in part on a bit-reversal de-interleaving procedure corresponding to a broadcast transmission mode type.

11. The apparatus of claim 9, wherein the instructions to reorder the identified REG indices further include instructions that are executable by the processor to cause the apparatus to:
reorder the identified REG indices for each of the plurality of REGs.

12. The apparatus of claim 11, wherein the instructions are further executable by the processor to cause the apparatus to:
perform wide-band channel estimation independent of the reordering.

13. The apparatus of claim 9, wherein the instructions are further executable by the processor to cause the apparatus to:
refrain from reordering the identified REG indices for each of the plurality of REGs after determining the transmission mode type of the control-resource set.

14. The apparatus of claim 13, wherein the instructions are further executable by the processor to cause the apparatus to:
refrain from performing wide-band channel estimation.

15. The apparatus of claim 9, wherein the instructions are further executable by the processor to cause the apparatus to:
generate a control channel based at least in part on decoding the control-resource set.

16. The apparatus of claim 9, wherein the instructions are further executable by the processor to cause the apparatus to:
determine that the control-resource set will be transmitted via broadcast, wherein reordering the identified REG indices comprises:
reorder the identified REG indices after determining that the transmission mode type of the control-resource set is broadcast transmission.

17. An apparatus for wireless communication, comprising:
means for receiving, from a base station, a control-resource set that includes a plurality of resource element groups (REGs) organized into one or more control channel elements based at least in part on a configuration of the control-resource set;
means for identifying a REG index for each REG of the plurality of REGs;

means for determining a transmission mode type of the control-resource set based at least in part on whether the configuration of the control-resource set is associated with broadcast transmission, wherein the transmission mode type is determined from a set of transmission mode types comprising broadcast transmission and unicast transmission;

means for reordering, before decoding the control-resource set and based at least in part on determining the transmission mode type of the control-resource set, the identified REG indices according to a bit-reversal de-interleaving procedure corresponding to the transmission mode type of the configuration of the control-resource set after determining the transmission mode type of the control-resource set, wherein the bit-reversal de-interleaving procedure comprises switching each bit of an REG binary index from a first value to a second value or from the second value to the first value; and means for decoding the control-resource set based at least in part on reordering the identified REG indices according to the transmission mode type.

18. The apparatus of claim 17, wherein the means for reordering the identified REG indices comprise:
means for reordering the identified REG indices for each of the plurality of REGs based at least in part on a bit-reversal de-interleaving procedure corresponding to a broadcast transmission mode type.

19. The apparatus of claim 17, wherein the means for reordering the identified REG indices comprise:
means for reordering the identified REG indices for each of the plurality of REGs.

20. The apparatus of claim 19, further comprising:
means for performing wide-band channel estimation independent of the reordering.

21. The apparatus of claim 17, further comprising:
means for refraining from reordering the identified REG indices for each of the plurality of REGs after determining the transmission mode type of the control-resource set.

22. The apparatus of claim 21, further comprising:
means for refraining from performing wide-band channel estimation.

23. The apparatus of claim 17, further comprising:
means for generating a control channel based at least in part on decoding the control-resource set.

24. The apparatus of claim 17, further comprising:
means for determining that the control-resource set will be transmitted via broadcast, wherein reordering the identified REG indices comprises:
means for reordering the identified REG indices after determining that the transmission mode type of the control-resource set is broadcast transmission.

25. A non-transitory computer-readable medium storing code for wireless communication, the code comprising instructions executable by a processor to:

receive, from a base station, a control-resource set that includes a plurality of resource element groups (REGs) organized into one or more control channel elements based at least in part on a configuration of the control-resource set;

identify a REG index for each REG of the plurality of REGs;

determine a transmission mode type of the control-resource set based at least in part on whether the configuration of the control-resource set is associated with broadcast transmission, wherein the transmission mode type is determined from a set of transmission mode types comprising broadcast transmission and unicast transmission;

reorder, before decoding the control-resource set and based at least in part on determining the transmission mode type of the control-resource set, the identified REG indices according to a bit-reversal de-interleaving procedure corresponding to the transmission mode type of the configuration of the control-resource set after determining whether the transmission mode type of the control-resource set, wherein the bit-reversal de-interleaving procedure comprises switching each bit of an REG binary index from a first value to a second value or from the second value to the first value; and decode the control-resource set based at least in part on reordering the identified REG indices according to the transmission mode type.

26. The non-transitory computer-readable medium of claim 25, wherein the instructions to reorder the identified REG indices further include instructions that are executable to:
reorder the identified REG indices for each of the plurality of REGs based at least in part on a bit-reversal de-interleaving procedure corresponding to a broadcast transmission mode type.

27. The non-transitory computer-readable medium of claim 25, wherein the instructions to reorder the identified REG indices further include instructions that are executable to:
reorder the identified REG indices for each of the plurality of REGs.

28. The non-transitory computer-readable medium of claim 27, wherein the instructions are further executable to:
perform wide-band channel estimation independent of the reordering.

29. The non-transitory computer-readable medium of claim 25, wherein the instructions are further executable to:
refrain from reordering the identified REG indices for each of the plurality of REGs after determining the transmission mode type of the control-resource set.

30. The non-transitory computer-readable medium of claim 29, wherein the instructions are further executable to:
refrain from performing wide-band channel estimation.

* * * * *